United States Patent [19]

Burt et al.

[11] Patent Number: 5,456,998
[45] Date of Patent: Oct. 10, 1995

[54] PHOTOCONDUCTIVE IMAGING MEMBERS CONTAINING ALKOXY-BRIDGED METALLOPHTHALOCYANINE DIMERS

[75] Inventors: Richard A. Burt, Oakville; Barkev Keoshkerian, Thornhill; George Liebermann; Cheng-Kuo Hsiao, both of Mississauga; Sandra J. Gardner, Willowdale; Dasarao K. Murti, Mississauga, all of Canada; Katsumi Daimon, Minami Ashigara, Japan; Yasuo Sakaguchi, Minami Ashigara, Japan; Ryosaku Igarashi, Minami-Ashigara, Japan

[73] Assignee: Xerox Corporation, Stamford, Conn.

[21] Appl. No.: 233,832

[22] Filed: Apr. 26, 1994

[51] Int. Cl.$^6$ ............................................. G03G 5/047
[52] U.S. Cl. ................................. 430/58; 430/59; 430/78
[58] Field of Search ....................... 430/59, 78, 58

[56] References Cited

U.S. PATENT DOCUMENTS

| | | | |
|---|---|---|---|
| 4,265,990 | 5/1981 | Stolka et al. | 430/59 |
| 4,311,775 | 1/1982 | Regan | 430/78 |

(List continued on next page.)

FOREIGN PATENT DOCUMENTS

| | | | |
|---|---|---|---|
| 57-148745 | 9/1982 | Japan | 430/78 |
| 63-141070 | 6/1988 | Japan | 430/78 |
| 1-028652 | 1/1989 | Japan | 430/78 |
| 1221459 | 9/1989 | Japan . | |
| 2-035463 | 2/1990 | Japan | 430/78 |

OTHER PUBLICATIONS

*Inorganic Chemistry*, 19, "Studies of A Series of Haloaluminum,–gallium, and –indium Phthalocyanines", Linsky et al., pp. 3131–3135 (1980).

(List continued on next page.)

Primary Examiner—Christopher D. Rodee
Attorney, Agent, or Firm—E. O. Palazzo

[57] ABSTRACT

Photoconductive imaging members comprised of an alkoxy-bridged metallophthalocyanine dimer as a charge generator material, wherein said dimer is of the formula $C_{32}H_{16}N_8MOROMN_8H_{16}C_{32}$ wherein M is a trivalent metal, and R is an alkyl group or an alkyl ether group

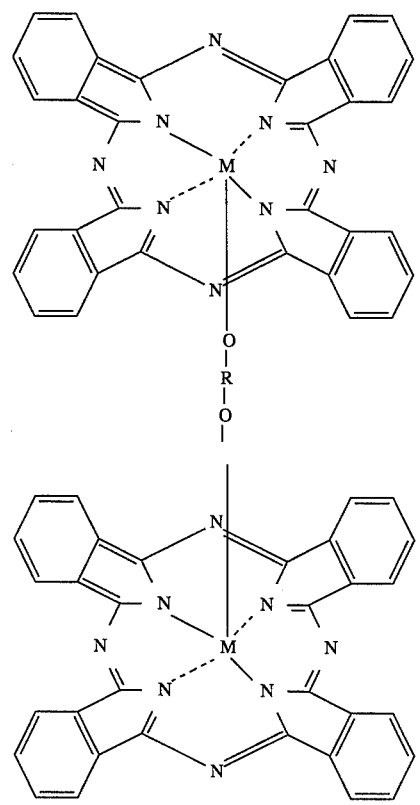

23 Claims, 10 Drawing Sheets

U.S. PATENT DOCUMENTS 4,725,519  2/1988  Suzuki et al. .............................. 430/78
5,234,785  8/1993  Itami et al. ................................ 430/59

OTHER PUBLICATIONS

Bull. Soc. Chim. Fr., 23 (1962), D. Colaitis.
Russ. J. Phys. Chem. (Engl. Transl.), 41, 251, 1967, I. S. Kirin et al.
Inorg. Chem. 12, 930, 1973, W. R. Bennett et al.
Inorg. Chem., 25, 3972, 1986, C. Ercolani et al.

PHOTOCONDUCTIVE IMAGING MEMBERS CONTAINING ALKOXY-BRIDGED METALLOPHTHALOCYANINE DIMERS

BACKGROUND OF THE INVENTION

This invention is generally directed to photoconductive imaging members containing alkoxy-bridged metallophthalocyanine dimers, and more specifically the present invention is directed to imaging members containing alkoxy-bridged metallophthalocyanine dimers of Formula 1 wherein M is a trivalent metal, or a metal in a trivalent form, and R is a structural moiety originating from the diol (HO—R—OH) used in the preparation of the dimer.

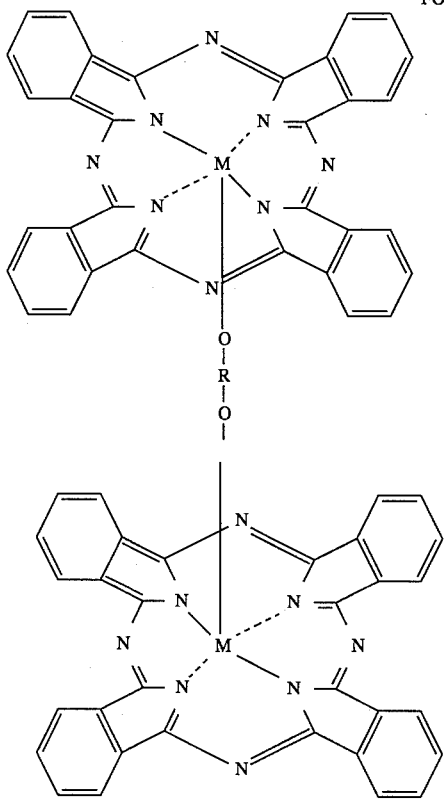

FORMULA 1

The present invention is directed, in embodiments, to photoresponsive, or photoconductive imaging members containing alkoxy-bridged gallium phthalocyanine dimers, reference copending application U.S. Ser. No. 239,432, the disclosure of which is totally incorporated herein by reference.

In embodiments, the alkoxy-bridged metallophthalocyanine dimers of the present invention can be selected as photogenerator pigments in layered photoresponsive imaging members. These photoresponsive imaging members may contain separate charge transport layers, such as hole transport layers. The photoresponsive imaging members with separate hole transport layers may contain hole transport molecules such as tertiary aryl amines, or hole transporting polymers. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and other printing processes wherein negatively charged or positively charged images are rendered visible with toner compositions of the appropriate charge. The imaging members containing alkoxy-bridged metallophthalocyanine dimers are sensitive in the wavelength regions of from about 500 to about 900 nanometers, therefore, diode lasers can be selected as the light source, especially diode lasers which emit light in the region of from 650 to 850 nanometers. The dimers can be prepared as illustrated in copending application U.S. Ser. No. 233,834, and which dimers are illustrated in copending application U.S. Ser. No. 239,432, the disclosures of which are totally incorporated herein by reference.

The use of certain phthalocyanine pigments, such as metal free phthalocyanine, vanadyl phthalocyanine, titanyl phthalocyanine, chloroindium phthalocyanines, and others as photogenerator materials in photoresponsive devices is known. Layered photoresponsive imaging members have been described in a number of U.S. Patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines.

Complex electrophotograhic properties, such as photosensitivity, dark decay, cyclic stability and environmental stability of photoconductive members, or electrophotographic photoreceptors, are, for example, dependent on the purity of the photogenerating pigment, dopant components and amounts, morphology, crystal defects, the photogenerating pigment selected, and analytical differences in the pigments. The differences in the electrophotographical properties of a pigment, often a particular polymorph, are usually traced to the processes by which the pigment was obtained. To obtain a phthalocyanine based electrophotographic photoreceptor having high sensitivity to near infrared light, it is believed necessary to control the synthesis and purification procedures in order to obtain a material with the desired purity, as well as to prepare the pigment in the correct crystal modification.

The alkoxy-bridged metallophthalocyanine dimers of the present invention are considered novel phthalocyanine dimers (or diphthalocyanines), which have an alkoxy bridge (—O—R—O) linking the two metal atoms of the metallophthalocyanine rings. The structure between the two oxygen molecules of the bridge is determined by the diol used in the synthesis. The trivalent metal in the phthalocyanine dimer structure can be aluminum, gallium or indium, or trivalent transitional metals, such as Mn(III), Fe(III), Co(III), Ni(III), Cr(III), and the like. Photoconductive imaging members containing alkoxy-bridged metallophthalocyanine dimers of the present invention possess in embodiments excellent cycling properties when compared, for example, to Type V hydroxygallium phthalocyanine prepared from chlorogallium phthalocyanine.

Certain metallophthalocyanines containing two phthalocyanine rings in the molecule have been described in the literature. Early work by P.A. Barrett et al. in *J. Chem Soc.*, 1717, 1936, discloses (AlPc)$_2$O, a μ-oxo bridged aluminum phthalocyanine. Bis(phthalocyaninato)lanthanide(III) complexes, also described as lanthanide diphthalocyanines [L(Pc)$_2$] were first reported by I.S. Kirin et al. in Russ. *J. Phys. Chem.*(Engl Transl), 41, 251, 1967. The lutetium phthalocyanine dimer is disclosed in the literature, for example for its electrochromic properties. *Phthalocyanines Properties and Applications,* 1989, VCH Publishers, Inc., edited by C. C. Leznoff and A.B.P. Lever, describes a series of these materials with the corresponding original references. Diphthalocyanines of tetravalent metals, such as stanium, Sn(Pc)$_2$, and zirconium, Zr(Pc)$_2$, of the structure shown in Formula 2, have been synthesized and described by W. R. Bennet et al. in *Inorg Chem.*, 12, 930, 1973 and J. Silver et al. in *Polyhedron,* 8, 1631, 1989.

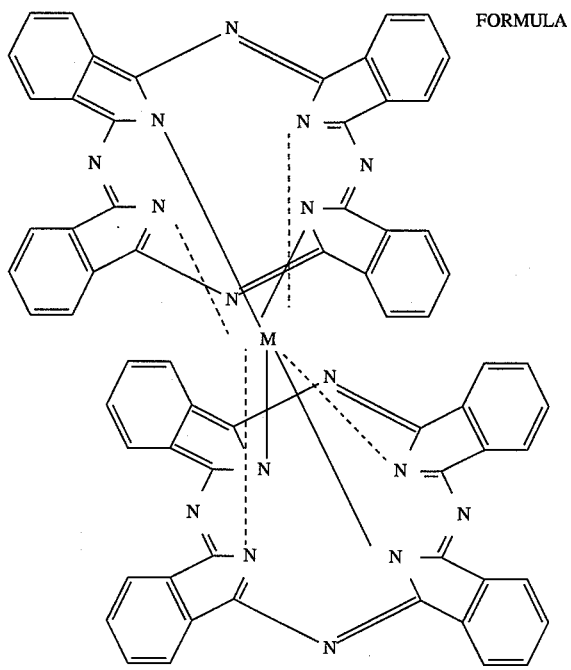

FORMULA 2

Many halometallo- and hydroxymetallo phthalocyanines of trivalent metals, such as Al, Ga and In, are described in the prior art, for example in *The Phthalocyanines,* vol. I and II, F. H. Moser and A. L. Thomas, CRC Press Inc., 1983 and by J. P. Linsky et al. in *Inorg. Chem.* 19, 3131, 1980.

In *Bull. Soc. Chim. Fr.,* 23 (1962), there is illustrated the preparation of chlorogallium phthalocyanine by reaction of o-cyanobenzamide with gallium chloride in the absence of solvent, and hydroxygallium phthalocyanine by dissolution of chlorogallium phthalocyanine in concentrated sulfuric acid, followed by reprecipitation in diluted aqueous ammonia. Further, there are illustrated in JPLO 1-221459 (Toyo Ink Manufacturing) processes for preparing chlorogallium phthalocyanines and hydroxygallium phthalocyanines, as well as photoreceptors for use in electrophotography. A number of hydroxygallium phthalocyanine polymorphs and processes for the preparation thereof are described in JPLO 5-263007, the disclosure of which is totally incorporated herein by reference.

More specifically, there is illustrated in JPLO 221459 a photoreceptor for use in electrophotography comprising a charge generation material and charge transport material on a conductive substrate, and charge generation material comprising one or a mixture of two or more of gallium phthalocyanine compounds which show the following intense diffraction peaks at Bragg angles (2 theta ±0.2° ) in the X-ray diffraction spectrum,

1—6.7, 15.2, 20.5, 27.0

2—6.7, 13.7, 16.3, 20.9, 26.3

3—7.5, 9.5, 11.0, 13.5, 19.1, 20.3, 21.8, 25.8,27.1, 33.0.

In Konica Japanese 64-17066/89, there is disclosed, for example, the use of a new crystal modification of titanyl phthalocyanine (TiOPc) prepared from alpha-type TiOPc (Type II) by milling it in a sand mill with salt and polyethylene glycol. This publication also discloses that this new polymorph differs from alpha-type pigment in its light absorption and shows a maximum absorbance at 817 nanometers while the alpha-type exhibits a maximum at 830 nanometers. The Konica publication also discloses the use of this new form of TiOPc in a layered electrophotographic device having high photosensitivity at exposure radiation of 780 nanometers. Further, this new polymorph of TiOPc is also described in U.S. Pat. No. 4,898,799 and in a paper presented at the Annual Conference of Japan Hardcopy in July 1989. In this paper, this same new polymorph is referred to as Type Y, and reference is also made to Types I, II, and III as A, B, and C, respectively. Also, in U.S. Ser. No. 169,486, the disclosure of which is totally incorporated herein by reference, there is illustrated a process for the preparation of hydroxygallium phthalocyanine Type V, essentially free of chlorine, whereby a pigment precursor Type I chlorogallium phthalocyanine is prepared by reaction of gallium chloride in a solvent, such as N-methylpyrrolidone, present in an amount of from about 10 parts to about 100 parts, and preferably about 19 parts with 1,3-diiminoisoindoline (DI$^3$) in an amount of from about 1 part to about 10 parts, and preferably about 4 parts of DI$^3$ for each part of gallium chloride that is reacted; hydrolyzing said pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example from about 10 to about 15 percent; and subsequently treating the resulting hydrolyzed pigment hydroxygallium phthalocyanine Type I with a solvent, such as N,N-dimethylformamide, present in an amount of from about 1 volume part to about 50 volume parts and preferably about 15 volume parts for each weight part of pigment hydroxygallium phthalocyanine that is used by, for example, ball milling said Type I hydroxygallium phthalocyanine pigment in the presence of spherical glass beads, approximately 1 millimeter to 5 millimeters in diamete, at room temperature, about 25 degrees, for a period of from about 12 hours to about 1 week, and preferably about 24 hours such that there is obtained a hydroxygallium phthalocyanine Type V, ball milling contains very low levels of residual chlorine of from about 0.001 percent to about 0.1 percent, and in an embodiment about 0.03 percent of the weight of the Type V hydroxygallium photogenerating pigment, as determined by elemental analysis.

Further, in U.S. Ser. No. 169,900, the disclosure of which is totally incorporated herein by reference, there is illustrated a process for the preparation of photogenerating hydroxygallium phthalocyanine Type V, which comprises formation of a precursor of gallium phthalocyanine, prepared by reaction of 1,3-diiminoisoindoline with gallium acetylacetonate in a suitable solvent solvent; hydrolyzing the precursor by dissolving in a strong acid and then reprecipitating the dissolved pigment in aqueous ammonia, thereby forming Type I hydroxygallium phthalocyanine; and admixing the Type I hydroxygallium phthalocyanine with a polar aprotic organic solvent; and more specifically a process for the preparation of Type V hydroxy gallium phthalocyanine which comprises preparing a precursor gallium phthalocyanine, by the reaction of 1,3-diiminoisoindoline with gallium acetylacetonate in a suitable solvent; filtering and thereafter washing the pigment precursor gallium phthalocyanine with hot N,N- dimethylformamide, followed by washing with an organic solvent, such as methanol, or acetone; hydrolyzing said precursor by dissolving in a strong acid and then reprecipitating the dissolved pigment in aqueous ammonia, thereby forming Type I hydroxygallium phthalocyanine; and admixing the Type I with the organic solvent N,N-dimethylformamide.

The alkoxy-bridged metallophthalocyanine dimers of the present invention can be obtained by the reaction of ortho-phthalodinitrile or 1,3-diiminoisoindoline with a trivalent metal alkoxide in the presence of a diol. During the aforementioned reaction, the diol, which can also act as a solvent for the reaction, is chemically incorporated into the phthalocyanine product with the formation of an alkoxy-bridged metallophthalocyanine dimer of the formula $C_{32}H_{16}N_8MOROMN_8H_{16}C_{32}$ as illustrated in Formula 1, wherein M is a trivalent metal and the alkoxy bridge (—O—R—O) contains the diol moiety (R). The alkoxy-bridged metallophthalocyanine dimers can also be obtained by the reaction of ortho-phthalodinitrile or 1,3-diiminoisoindoline with other complexes of trivalent metals, such as the acetates and acetylacetonates, in the presence of a diol. Alternatively, the alkoxy-bridged metallophthalocyanine dimers can be prepared by the reaction of hydroxy metallophthalocyanines of a trivalent metal with a diol in the presence of excess diol or another solvent. Processes for the preparation of the dimers are illustrated in copending patent applications U.S. Ser. No. 239,432, and U.S. Ser. No. 233,195, the disclosures of which are totally incorporated herein by reference.

In the following copending patent applications filed concurrently herewith there is illustrated: U.S. Ser. No. 239,432 akoxy-bridged metallophthalocyanine dimers of the formula $C_{32}H_{16}N_8MOROMN_8H_{16}C_{32}$, or of the formula

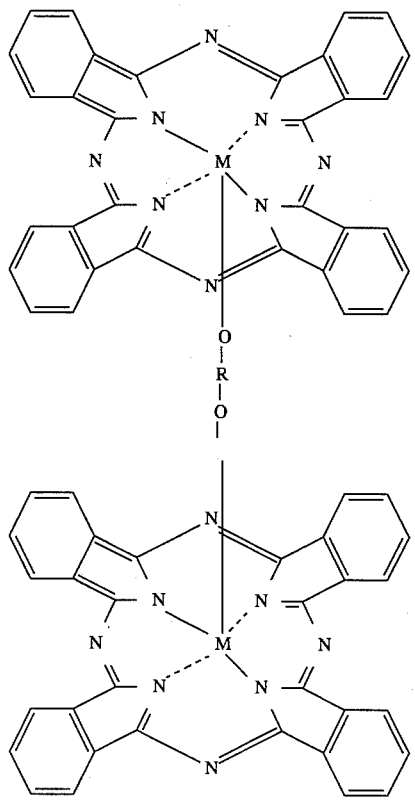

wherein M is a metal, and R is an alkyl or an alkyl ether; U.S. Ser. No. 233,834 a process for the preparation of Type V hydroxygallium phthalocyanine which comprises the in situ formation of an alkoxy-bridged gallium phthalocyanine dimer, hydrolyzing said alkoxy-bridged gallium phthalocyanine dimer to hydroxygallium phthalocyanine, and subsequently converting the hydroxygallium phthalocyanine product obtained to Type V hydroxygallium phthalocyanine; a process for the preparation of Type V hydroxygallium phthalocyanine which comprises the formation of an alkoxy-bridged gallium phthalocyanine dimer by the reaction of an organic gallium complex with ortho-phthalocyannine, or 1,3-diiminoisoindoline and a diol; and U.S. Ser. No. 235,195 is a process for the preparation of alkoxy-bridged metallophthalocyanine dimers by the reaction of a trivalent metal compound with ortho-phthalodinitrile or 1,3-diiminoisoindoline in the presence of a diol.

The disclosures of all of the aforementioned publications, laid open applications, copending applications and patents, are totally incorporated herein by reference.

SUMMARY OF THE INVENTION

It is an object of the present invention to provide photoresponsive imaging members containing alkoxy-bridged metallophthalocyanine dimers with many of the advantages illustrated herein.

Another object of the present invention relates to the provision of layered photoresponsive imaging members containing alkoxy-bridged metallophthalocyanine dimers with near infrared photosensitivity.

In a further object of the present invention there are provided photoresponsive imaging members with a photogenerator layer comprised of alkoxy-bridged metallophthalocyanine dimers.

In still a further object of the present invention there are provided photoresponsive imaging members with an aryl amine hole transport layer, and a photogenerator layer comprised of alkoxy-bridged metallophthalocyanine dimers.

Moreover, it is an object of the present invention to provide photoresponsive imaging members containing alkoxy-bridged metallophthalocyanine dimers of the formula $C_{32}H_{16}N_8MOROMN_8H_{16}C_{32}$, where the metal M is a trivalent metal such as aluminum, gallium, indium, or other metals in a trivalent form such as Fe(III), Cr(III), Co(Ill), Mn(III), Ni(III), or V(III); and R is an alkyl group or an alkyl ether.

It is another object of the present invention to provide photoresponsive imaging members containing alkoxy-bridged metallophthalocyanine dimers of the formula $C_{32}H_{16}N_8MOROMN_8H_{16}C_{32}$, where R is a moiety provided by the diol used in the preparation of the phthalocyanine dimer.

In a further object of the present invention there are provided photoresponsive imaging members containing alkoxy-bridged gallium phthalocyanine dimers of the formula $C_{32}H_{16}N_8GaOROGaN_8H_{16}C_{32}$, where R is a moiety provided by the diol used in the preparation of the phthalocyanine dimer.

It is another object of the present invention to provide photoresponsive imaging members containing alkoxy-bridged gallium phthalocyanine dimers of the formula $C_{32}H_{16}N_8GaOCH_2CH_2OGaN_8H_{16}C_{32}$, $C_{32}H_{16}N_8GaOCH(CH_3)CH_2OGaN_8H_{16}C_{32}$ and $C_{32}H_{16}NaGaOCH_2CH_2CH_2OGaN_8H_{16}C_{32}$.

DESCRIPTION OF THE PREFERRED EMBODIMENTS

These and other objects of the present invention can be accomplished by the provision of numerous different photoresponsive imaging members with alkoxy-bridged metallophthalocyanine dimers, and specifically with alkoxy-bridged gallium phthalocyanine dimers.

The photogenerating alkoxy-bridged galliumphthalocyanine dimers of the general formula as illustrated in Formula 3.

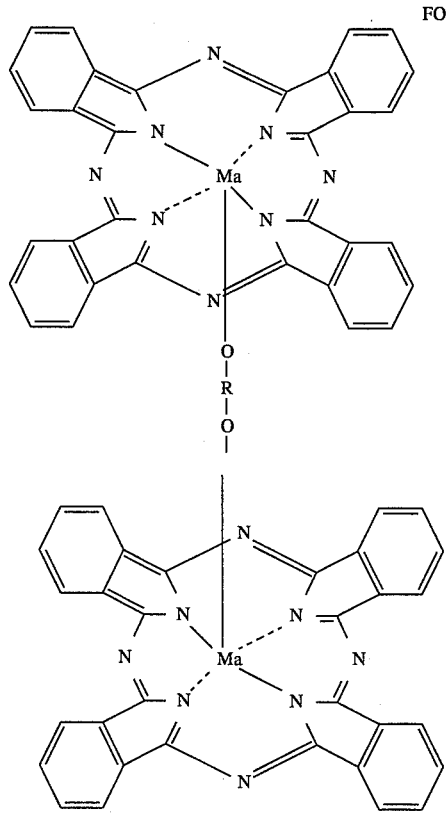

FORMULA 3 with, for example, from 2 to about 10, and preferably about 2 to 6 carbon atoms in the alkoxy-bridge (—O—R—O), and Wherein M is a trivalent metal and R is an alkyl group or alkyl ether group, and which dimers can be obtained by the processes illustrated herein in the copending patent applications U.S. Ser. No. 239,432, U.S. Ser. No.233,834, and U.S. Ser. No. 233,2195, which dimers are selected as the photogenerating pigment for the photoconductive imaging members of the present invention.

In embodiments of the present invention there are provided processes for the preparation of alkoxy-bridged gallium phthalocyanine dimers by the reaction of a gallium alkoxide with ortho-phthalodinitrile or 1,3-diiminoisoindoline and a selected diol.

In further embodiments of the present invention, there are provided methods for the preparation of alkoxy-bridged gallium phthalocyanine dimers by the reaction of gallium acetate or gallium acetylacetonate with ortho-phthalodinitrile or 1,3-diiminoisoindoline, and a diol. The alkoxy-bridged gallium phthalocyanine dimer formed is of the the general formula $C_{32}H_{16}N_8MaOROMaN_8H_{16}C_{32}$ with, for example, from 2 to about 10, and preferably about 2 to 6 carbon atoms in the alkoxy bridge (—O—R—O).

In preferred embodiments, gallium alkoxide can be prepared by reacting a gallium trihalide, especially the trichloride, with an alkali metal alkoxide, and thereafter reacting the resulting gallium alkoxide with, for example, ortho-phthalodinitrile or 1,3-diiminoisoindoline, and a dialcohol (diol) to form the alkoxy-bridged gallium phthalocyanine dimers. The diol may also serve as a reaction solvent, or an organic solvent may also be used, such as N-methylpyrrolidone; halonaphthalenes like 1-chloronaphthalene; quinoline, and the like.

In preferred embodiments, the gallium alkoxide can be prepared by reacting gallium trichloride with a sodium alkoxide, such as methoxide or ethoxide, and thereafter reacting the resulting gallium alkoxide with, for example, ortho-phthalodinitrile or 1,3-diiminoisoindoline, and a dialcohol (diol) to form the alkoxy-bridged gallium phthalocyanine dimers.

In another preferred embodiment, the gallium alkoxide can be prepared by reacting gallium trichloride with sodium methoxide, and thereafter reacting the resulting gallium methoxide with ortho-phthalodinitrile and 1,2-ethanediol (ethylene glycol) to form the alkoxy-bridged gallium phthalocyanine dimer with the formula $C_{32}H_{16}N_8GaOCH_2CH_2OGaN_8H_{16}C_{32}$, reference Formula 4.

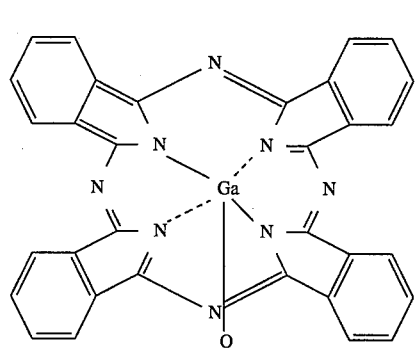

FORMULA 4

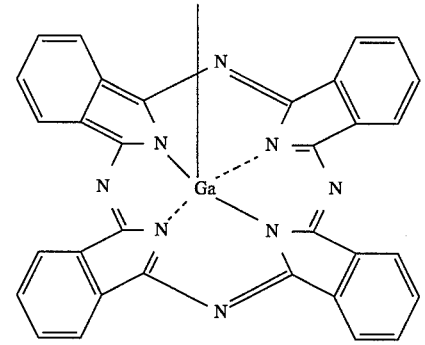

In another embodiment, the process of the present invention comprises the reaction of a metal trihalide like gallium trichloride with an alcohol like methanol, ethanol or butanol, and a base, such as ammonia, and subsequently reacting the resulting gallium alkoxide with, for example, ortho-phthalodinitrile or 1,3-diiminoisoindoline in the presence of a dialcohol (diol), which may also serve as a reaction solvent, to form the alkoxy-bridged gallium phthalocyanine dimers.

Specific embodiments comprise initially preparing the trivalent metal alkoxide as indicated herein, which may then be separated from the byproduct or used in situ, followed by reaction of the metal alkoxide with ortho-phthalodinitrile or 1,3-diiminoisoindoline in a dialcohol (diol) solvent, to form the alkoxy-bridged metallophthalocyanine dimer. During the aforementioned reaction, some of the dialcohol solvent is chemically incorporated into the dimer product as a bridging unit between two metallophthalocyanine units. The resulting alkoxy-bridged metallophthalocyanine dimers, such as alkoxy-bridged gallium phthalocyanine dimers, can be selected for utilization in layered photoconductive imaging members, including those that possess infrared photosensitivity, for example from about 600 to about 900 nanometers, and wherein the dimer is selected as the photogenerating pigment. Alternatively, the alkoxy-bridged metallophthalocyanine dimer can be converted to the corresponding hydroxy metallophthalocyanine, which phthalocyanines may be selected as the photogenerating pigment.

In embodiments, a trivalent metal alkoxide can be obtained from the reaction of the corresponding metal trihalide with an alkali metal salt of an alcohol, such as sodium ethoxide. The formed trivalent metal alkoxide can be separated from the alkali metal halide byproduct by filtration, or the mixture may be utilized in situ in the subsequent reaction to form the alkoxy-bridged metallophthalocyanine dimer. The trivalent metal alkoxide can also be obtained from the reaction of the corresponding metal trihalide with an alcohol in the presence of a base, such as ammonia. The formed trivalent metal alkoxide can be separated from the ammonium halide byproduct by filtration, or the mixture may be utilized in situ in the subsequent reaction to form the alkoxy-bridged metallophthalocyanine dimers.

The trivalent metal alkoxide can thus be obtained from the reaction of the corresponding metal trihalide with an alkali metal alkoxide, such as sodium ethoxide. The alkali halide byproduct formed can be separated from the reaction mixture by filtration, or the mixture may be utilized as is (in situ) in the subsequent reaction to form the alkoxy-bridged metallophthalocyanine dimers. In embodiments, the gallium alkoxide can be prepared by reacting a gallium trihalide, especially the trichloride, and sodium methoxide, and thereafter reacting the resulting gallium methoxide with, for example, ortho-phthalodinitrile or 1,3-diiminoisoindoline in the presence of a dialcohol (diol), which may also serve as a reaction solvent to form the alkoxy-bridged gallium phthalocyanine dimer.

A number of photoresponsive imaging members with the novel alkoxy-bridged metallophthalocyanine dimer pigments illustrated herein can be fabricated. In embodiments, the layered photoresponsive imaging members are comprised of a supporting substrate, a charge transport layer, especially an aryl amine based hole transport layer, or a hole transporting aryl amine polycondensation polymer, and situated therebetween a photogenerator layer comprised of the alkoxy-bridged metallophthalocyanine dimer photogenerating pigment. Another embodiment of the present invention is directed to positively charged layered photoresponsive imaging members comprised of a supporting substrate, a charge transport layer, especially an aryl amine hole transport layer, and a top overcoating layer containing an alkoxy-bridged metallophthalocyanine dimer. Moreover, there is provided in accordance with the present invention a negatively charged photoresponsive imaging member comprised of a supporting substrate, a thin adhesive layer, a photogenerating layer containing alkoxy-bridged metallophthalocyanine dimer, such as an alkoxy-bridged gallium phthalocyanine dimer photogenerator dispersed in a polymeric resinous binder, such as a poly(vinyl butyral), a polycarbonate, or a styrene-vinylpyridine block copolymer, and as a top layer, aryl amine hole transporting molecules dispersed in a polymeric resinous binder such as polycarbonate, or a hole transporting aryl amine polycondensation polymer.

Examples of specific dimer photogenerating pigments include 1,2-di(oxoaluminum phthalocyaninyl) ethane, 1,2-di(oxogallium phthalocyaninyl) ethane, 1,2-di(oxoindium phthalocyaninyl) ethane, 1,3-di(oxoaluminum phthalocyaninyl) propane, 1,3-di(oxogallium phthalocyaninyl) propane, 1,3-di(oxoindium phthalocyaninyl) propane, 1,2-di(oxoaluminum phthalocyaninyl) propane, 1,2-di(oxogallium phthalocyaninyl) propane, and 1,2-di(oxoindium phthalocyaninyl) propane.

The photoresponsive imaging members of the present invention can be prepared by a number of known methods, the type of coating process, the coating process parameters and the order of coating of the layers being dependent on the member desired. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40 to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging and printing processes wherein the alkoxy-bridged metallophthalocyanine dimer absorbs light of a wavelength of from about 500 to about 900 nanometers, and preferably from about 650 to about 850 nanometers. In these known processes, electrostatic latent images are initially formed on the imaging member followed by development, and thereafter transferring the image to a suitable substrate.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polyester, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In embodiments, the substrate is in the form of a seamless flexible belt. In some situations, it may be desirable to coat on the back of the substrate, particularly when the substrate is a flexible organic polymeric material, an anticurl layer, such as for example polycarbonate materials commercially available such as MAKROLON®.

The photoconductive imaging member may optionally contain a charge blocking layer situated between the conductive substrate and the photogenerating layer. This layer may comprise metal oxides, such as aluminum oxide and the like, or materials such as silanes, or polymers such as polyesters. The primary purpose of this layer is to prevent charge injection from the substrate during and after charging. The charge blocking layer may be from about 0.01 to 0.2 micron thick and preferably from 0.02 to 0.08 micron thick.

Intermediate adhesive layers between the substrate and subsequently applied layers may be desirable to improve adhesion. Typical adhesive layers include film forming polymers such as polyester, polyvinylbutyral, polyvinylpyrrolidone, polycarbonate, polyurethane, polymethyl methacrylate, and the like, and mixtures thereof. Since the surface of the substrate can be a metal oxide layer or an adhesive layer, the expression "substrate" as employed herein is intended to include in embodiments a metal oxide layer with or without an adhesive layer on a metal oxide layer. The adhesive layer may be from about 0.01 to 0.2 micron thick and preferably from 0.02 to 0.08 micron in thickness.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone, and the like. The adhesive interface layer may be from about 0.01 to 0.2 micron thick and preferably from 0.02 to 0.08 micron in thickness.

The photogenerator layer is preferably comprised of the alkoxy-bridged phthalocyanine dimer especially the gallium dimer dispersed in polymer binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the alkoxy-bridged metallophthalocyanine dimer photogenerator is present in an amount of from about 5 percent to about 100 percent by volume. In embodiments, this layer is of a thickness of 0.01 to about 30, and preferably from about 0.10 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The photogenerator layer can be fabricated by coating a dispersion of the alkoxy-bridged metallophthalocyanine dimer in a suitable solvent with or without an optional polymer binder material. The dispersion can be prepared by mixing and/or milling the alkoxy-bridged metallophthalocyanine dimer in equipment such as paint shakers, ball mills, sand mills and attritors. Common grinding media such as glass beads, steel balls or ceramic beads may be used in this equipment. The binder which can be present in an amount of from about 5 to 80 percent may be selected from a number of known polymers or resins suitable for this purpose such as poly(vinyl butyral), poly(vinyl carbazole), polyesters, polycarbonates, poly(vinyl chloride), polyacrylates and the like. In embodiments of the present invention, it is desirable to select a coating solvent that does not disturb or adversely affect the other previously coated layers of the device. Examples of components that can be selected for use as coating solvents for the photogenerator layer are ketones, alcohols, aromatic hydrocarbons, halogenated aliphatic or aromatic hydrocarbons, ethers, amines, amides, esters, and the like. Specific solvent examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, dimethylformamide, dimethylacetamide, butyl acetate, ethyl acetate and methoxyethyl acetate, and the like. The coating of the photogenerator layer in embodiments of the present invention can be accomplished with spray, dip or wire-bar methods such that the final dry thickness of the photogenerator layer is from 0.01 to 30 microns and preferably from 0.1 to 15 microns after being dried at 40° to 150° C. for 5 to 90 minutes.

Illustrative examples of polymeric binder materials that can be selected for the photogenerator pigment are as illustrated herein and include those polymers as disclosed in U.S. Pat. 3,121,006, the disclosure of which is totally incorporated herein by reference. The binder resin may be selected from a wide number of polymers such as polyesters, poly(vinyl butyral), poly(vinyl carbazole), polycarbonates, poly(vinyl chloride), polyacrylates and methacrylates, phenoxy resins, polyurethanes, poly(vinyl alcohol), polyacrylonitrile, polystyrene, copolymers and block copolymers of selected monomers such as styrene and vinylpyridine, and the like. The solvents used to dissolve these binders depend upon the particular resin.

The charge transport layer is generally a nonphotoconductive material which supports the injection of photogenerated holes from the generator layer. The hole transporting layer is generally of a thickness of from about 5 microns to about 75 microns, and preferably of a thickness of from about 10 microns to about 40 microns. The charge transport layer may be a material comprising a hole transporting small molecule such as an aryl amine in an inactive, highly insulating and transparent polymer binder. Aryl amines selected for the hole transporting layer include molecules of the following formula

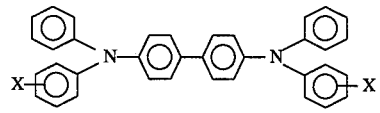

wherein X is an alkyl group or a halogen, especially those substituents selected from the group consisting of Cl and $CCH_3$.

Examples of specific aryl amines are N,N'-diphenyl-N, N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)- 1,1'-biphenyl-4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Charge transporting polymers, such as aryl amine polycondensation polymers described in U.S. Pat. Nos. 4,806,443 and 5,028,687, the disclosures of which are totally incorporated herein by reference, can also be selected.

Examples of the highly insulating and transparent polymer binder material for the transport layers include materials such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies, as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635;

4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The xerographic electrical properties of the imaging members can be determined by known means, including as indicated herein electrostatically charging the surfaces thereof with a corona discharge source until the surface potentials, as measured by a capacitively coupled probe attached to an electrometer, attains an initial value $V_O$ of about −800 volts. After resting for 0.5 second in the dark, the charged members attain a surface potential of $V_{ddp}$, dark development potential. Each imaging member is then exposed to light from a filtered Xenon lamp with a XBO 150 watt bulb, thereby inducing a photodischarge which results in a reduction of surface potential to a $V_{bg}$ value, background potential. The desired wavelength and energy of the exposed light can be determined by the type of filters placed in front of the lamp. The monochromatic light photosensitivity is determined by using a narrow band-pass filter. The dark decay in volts per second was calculated as $(V_O - V_{ddp})/0.5$. The photosensitivity of the imaging members is provided in terms of the amount of exposure energy in ergs/cm$^2$, designated as $E_{1/2}$, required to achieve 50 percent photodischarge from the dark development potential. $E_{800-100v}$, which is the amount of exposure energy causing reduction of the $V_{ddp}$ from 800 volts to 100 volts, was also determined. The higher the photosensitivity is indicated by the smaller the $E_{1/2}$ and $E_{800-100v}$ values. Cyclic stability is determined by performing cycling tests. Devices were charged with a corotron to about −800 volts. They were exposed with 775 nanometers of light with an intensity of about 7 ergs/cm$^2$ and erased with white light of about 60 ergs/cm$^2$. The dark development ($V_{ddp}$) and background ($V_{bg}$) potentials were measured and recorded while the testing was performed for 10,000 cycles. After the cycling test had been completed, the devices remained in the dark for about 20 hours. After charging the device to about −800 volts with a corotron, they were exposed with 775 nanometers of light with an intensity of 3 ergs/cm$^2$ and erased with white light of about 200 ergs/cm$^2$. The dark development and background potentials were measured and recorded while the testing was performed for 5,000 cycles. The significantly higher erase light intensity, used in this second test compared to the standard test, accelerates the cycledown (decrease in the dark development potential) in the photogenerator material and is thus considered a stress test. The smaller values of the voltage loss of both the dark development ($V_{ddp}$) and background ($V_{bg}$) potentials represent the better cyclic stability.

BRIEF DESCRIPTION OF THE DRAWINGS

For a better understanding of the present invention and further features thereof, reference is made to the following detailed description of various preferred embodiments wherein.

The following Examples are intended to be illustrative only, and the invention is not intended to be limited to the materials, conditions, or process parameters recited therein, percentages are by weight unless otherwise indicated. Comparative Examples and data are also provided.

EXAMPLE I

Figure 1:
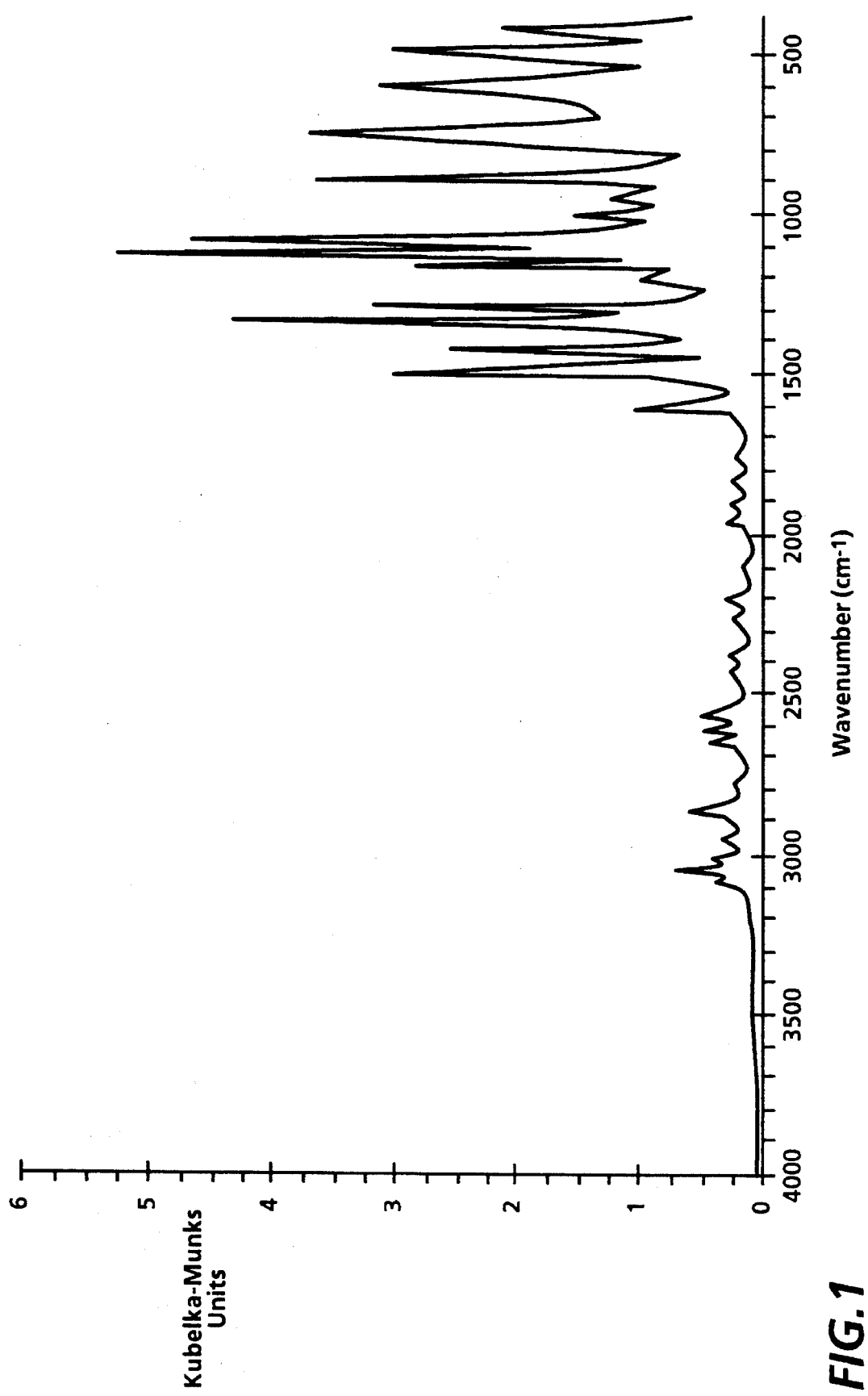
FIG. 1 represents an infrared plot of the alkoxy-bridged gallium phthalocyanine dimer of the formula $C_{32}H_{16}N_8GaOCH_2CH_2OGaN_8H_{16}C_{32}$ prepared as described in Example I.
Figure 2:
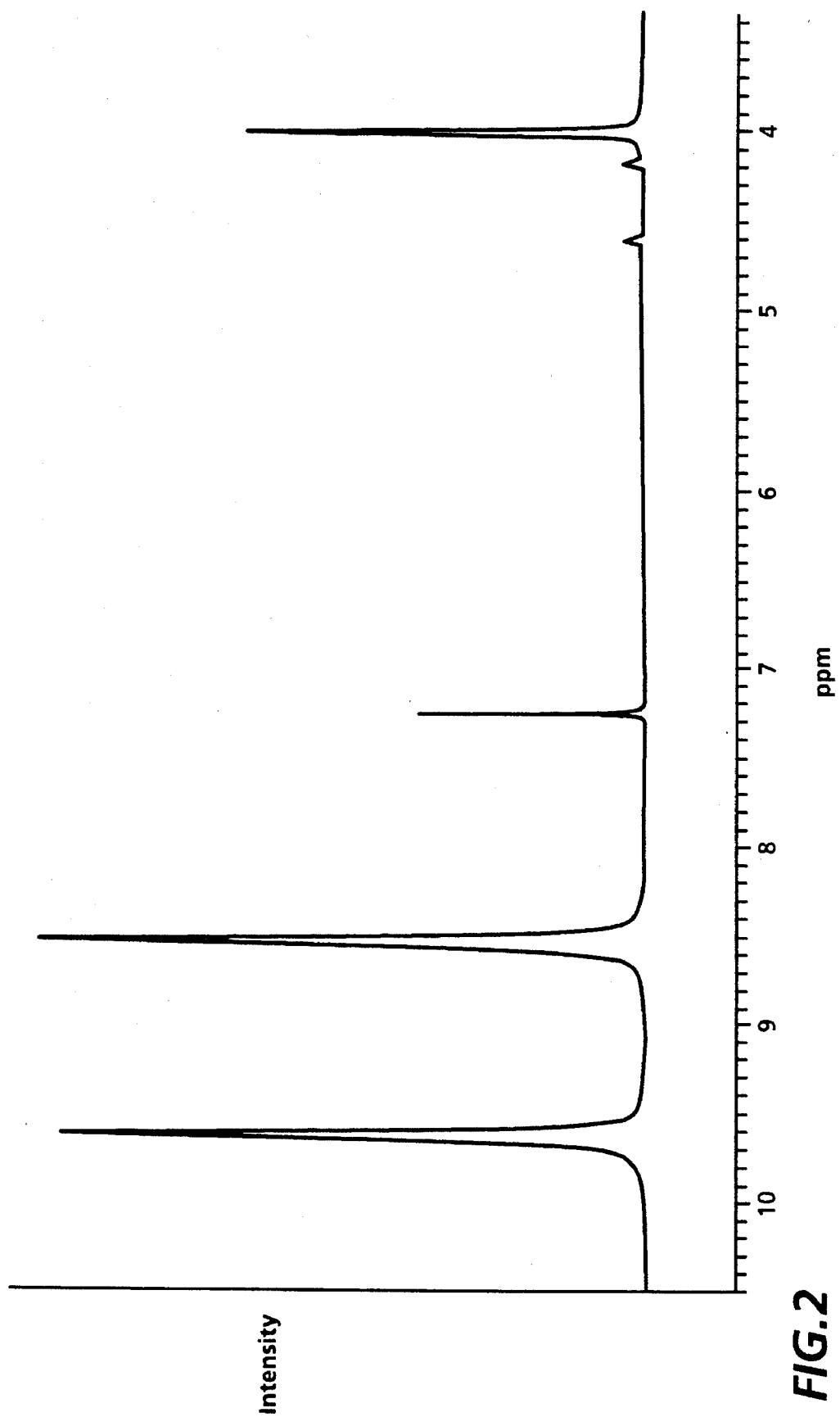
FIG. 2 represents a plot of 1H NMR spectroscopy (in TFA-d/CDCl$_3$ solution) of the alkoxy-bridged phthalocyanine dimer prepared as described in Example I.
Figure 3:
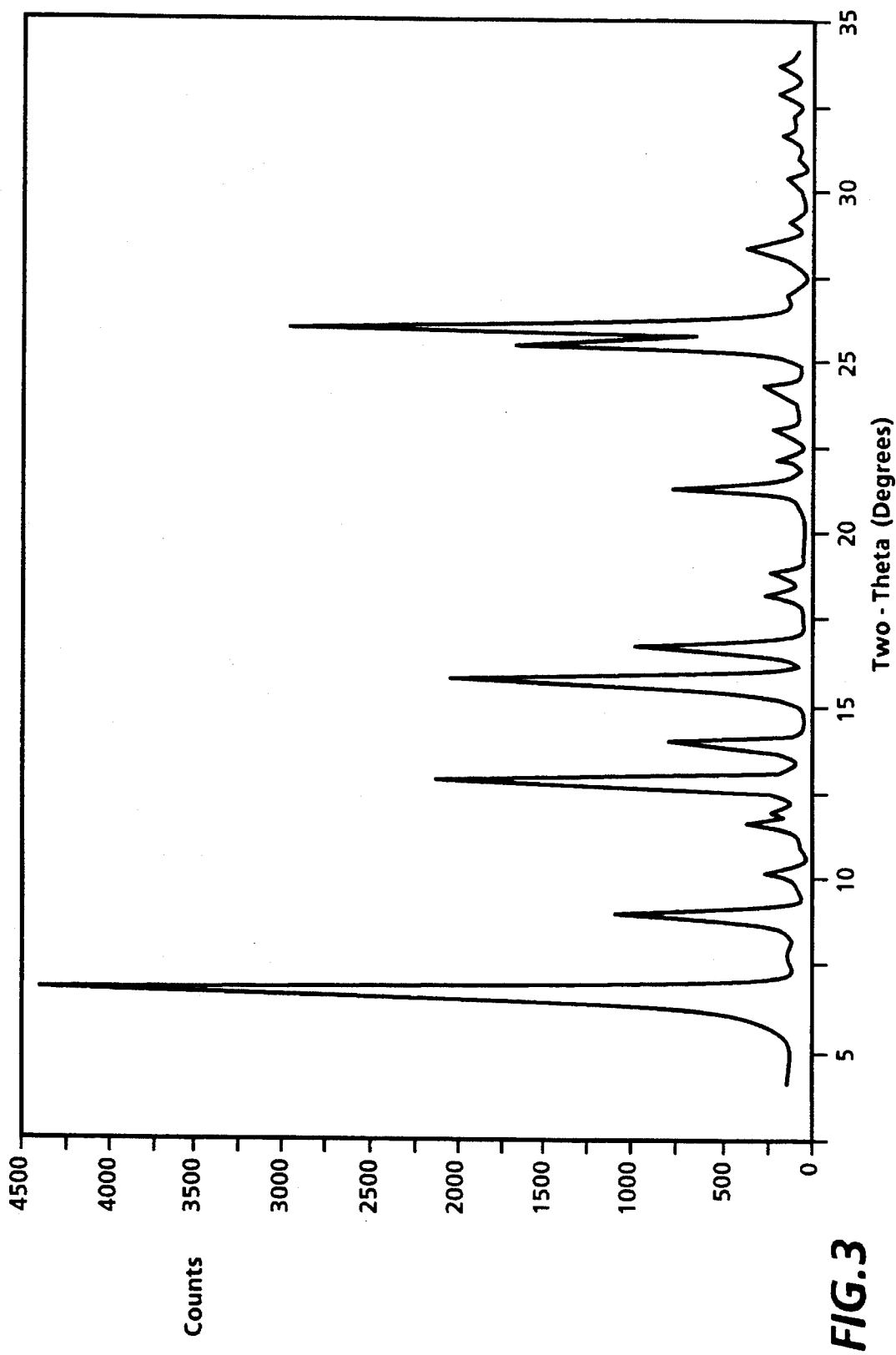
FIG. 3 represents an X-ray powder diffraction trace for the alkoxy-bridged gallium phthalocyanine dimer (Type I polymorph) prepared as described in Example I.

Alkoxy-bridged Gallium Phthalocyanine Dimer Synthesis Using Gallium Methoxide Obtained From Gallium Chloride and Sodium Methoxide In Situ:

To a 1 liter round bottomed flask were added 25 grams of GaCl$_3$ and 300 milliliters of toluene, and the mixture was stirred for 10 minutes to form a solution. Then, 98 milliliters of a 25 weight percent sodium methoxide solution (in methanol) were added while cooling the flask with an ice bath to keep the contents below 40° C. Subsequently, 250 milliliters of ethylene glycol and 72.8 grams of o-phthalodinitrile were added. The methanol and toluene were quickly distilled off over 30 minutes while heating from 70° to 135° C., and then the phthalocyanine synthesis was performed by heating at 195° C. for 4.5 hours. The alkoxy-bridged gallium phthalocyanine dimer product formed was isolated by filtration at 120° C. The product was then washed with 400 milliliters of DMF at 100° C. for 1 hour and filtered. The product was then washed with 600 milliliters of deionized water at 60° C. for 1 hour and filtered. The product was then washed with 600 milliliters of methanol at 25° C. for 1 hour and filtered. The product was dried at 60° C. under vacuum for 18 hours. The alkoxy-bridged gallium phthalocyanine dimer, 1,2-di(oxogallium phthalocyaninyl) ethane, was isolated as a dark blue solid in 77 percent yield. The dimer product was characterized by elemental analysis, infrared spectroscopy, $^1$H NMR spectroscopy and X-ray powder diffraction. Elemental analysis showed the presence of only 0.10 percent chlorine. Infrared spectroscopy: major peaks at 573, 611, 636, 731, 756, 775, 874, 897, 962, 999, 1069, 1088, 1125, 1165, 1289, 1337, 1424, 1466, 1503, 1611, 2569, 2607, 2648, 2864, 2950, and 3045 cm$^{-1}$ (FIG. 1); $^1$H NMR spectroscopy (TFA-d/CDCl$_3$ solution, 1:1 v/v, tetramethylsilane reference): peaks at (δ, ppm ±0.01 ppm) 4.00 (4H), 8.54 (16H), and 9.62 (16H) (FIG. 2); X-ray powder diffraction pattern: peaks at Bragg angles (2Θ±0.2°) of 6.7, 8.9, 12.8, 13.9, 15.7, 16.6, 21.2, 25.3, 25.9, and 28.3, with the highest peak at 6.7 degrees 2Θ (FIG. 3).

EXAMPLE II

Figure 4:
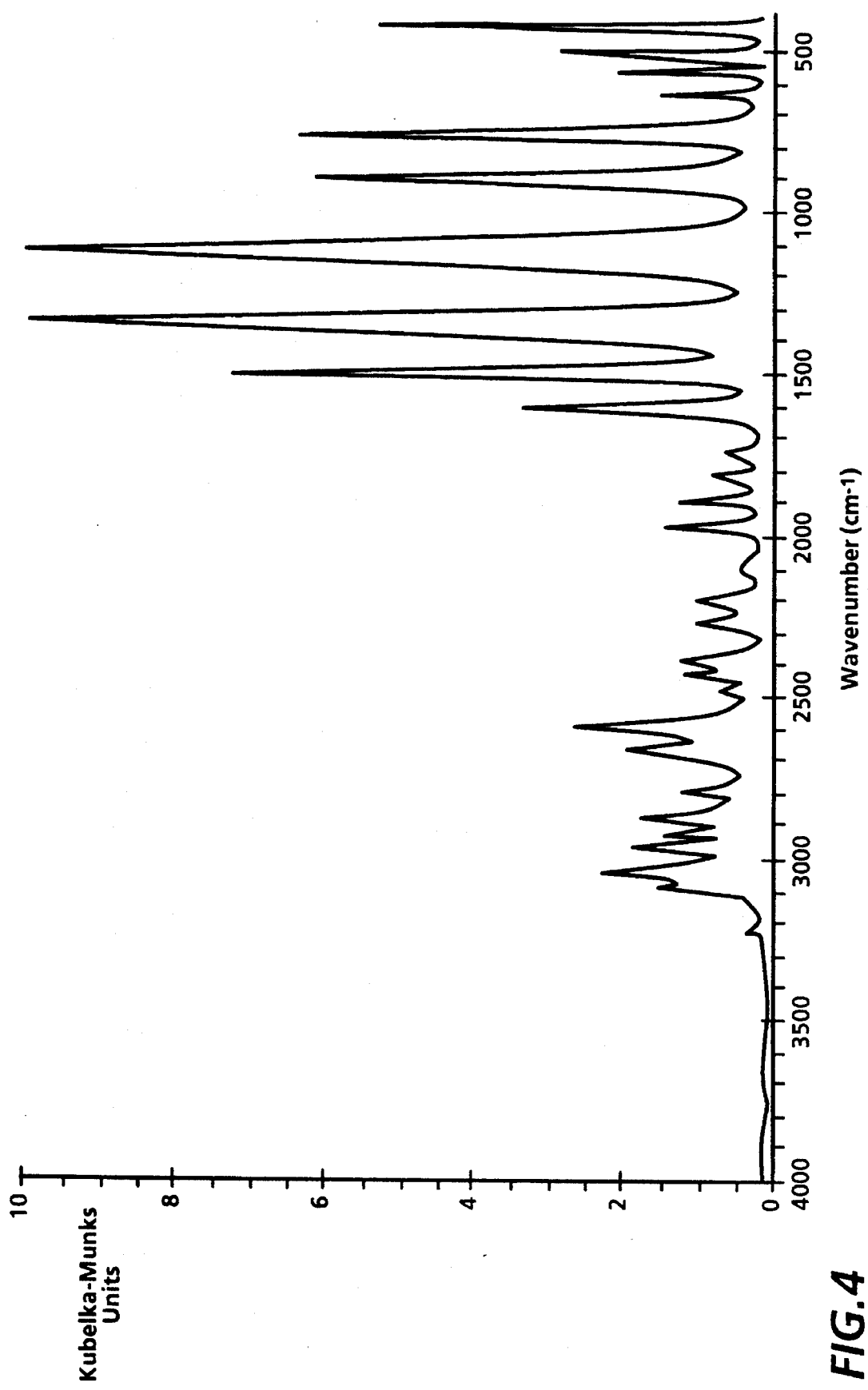
FIG. 4 is an infrared plot of the chlorogallium phthalocyanine prepared as described in Example II.
Figure 5:
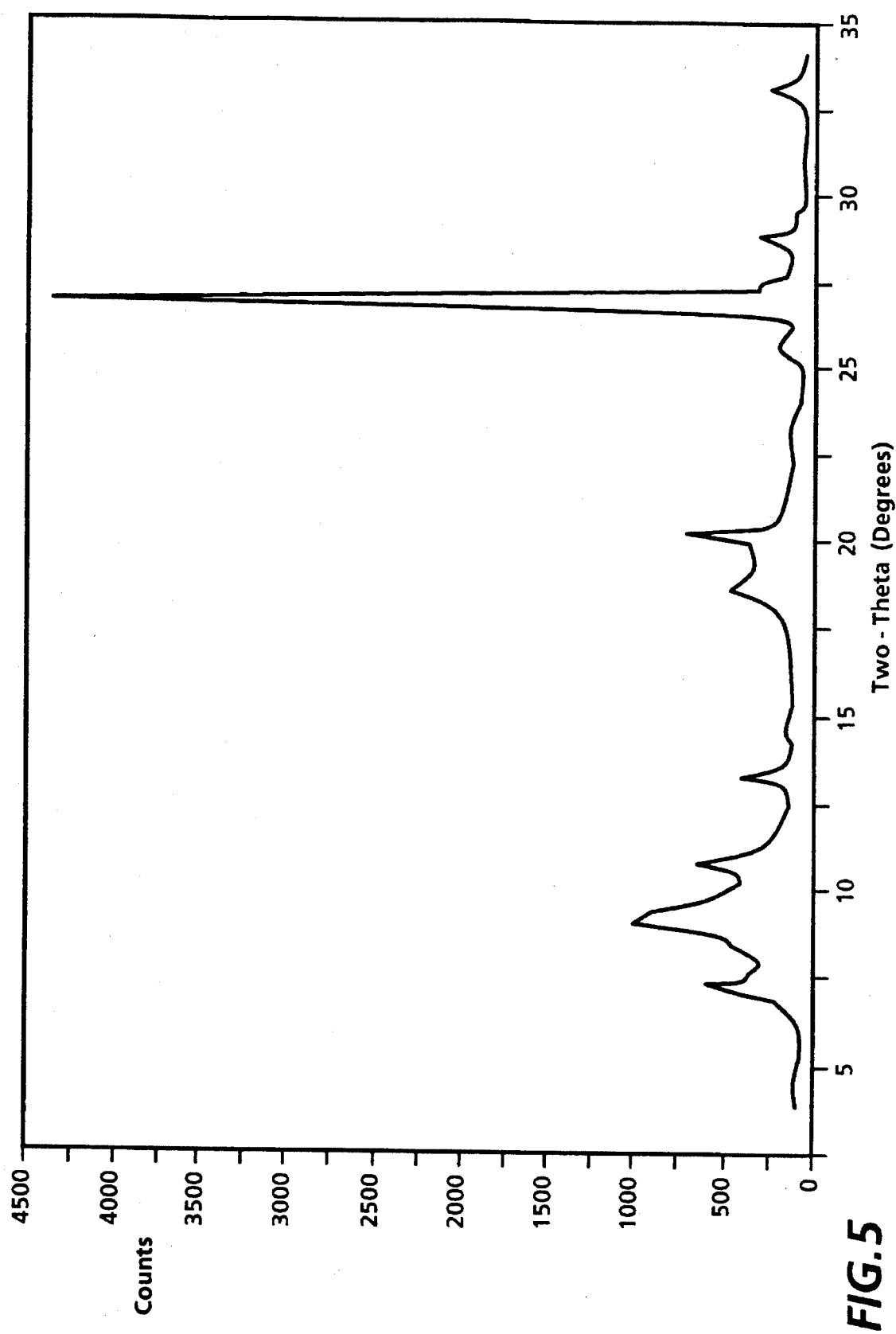
FIG. 5 is an X-ray powder diffraction trace for the chlorogallium phthalocyanine (Type I polymorph) prepared as described in Example II.

Chlorogallium Phthalocyanine Synthesis Using Gallium Trichloride in 1-Chloronaphthalene:

To a 5 liter round bottomed flask equipped with stirring and a nitrogen purge atmosphere were added 200 grams of $GaCl_3$ plus 582 grams of o-phthalodinitrile and 2.75 liters of 1-chloronaphthalene. The phthalocyanine synthesis was performed at 200° C. for 4 hours. The phthalocyanine was filtered at 120° C. and then washed in the filter with 350 milliliters of DMF. The product was then washed in a beaker with 1.5 liters of DMF at 22° C. for 30 minutes and filtered. The product was then washed in a beaker with 1.5 liters of DMF at 100° C. for 1 hour and filtered. The product was then washed again at 22° C. for 30 minutes in a beaker with 1.5 liters of DMF and filtered. The product was then washed in a beaker with 1.5 liters of methanol at 65° C. for 1 hour and filtered. The product was then washed again at 22° C. for 30 minutes in a beaker with 1.5 liters of methanol and filtered. The resulting wet cake was dried at 60° C. under vacuum for 18 hours resulting in 271 grams of chlorogallium phthalocyanine (39 percent yield). The product pigment hydroxygallium phthalocyanine Type V was characterized by elemental analysis, infrared spectroscopy and X-ray powder diffraction. Elemental analysis showed the presence of 5.60 percent chlorine (theoretical value for ClGaPc is 5.74 percent). Infrared spectroscopy: major peaks at 432, 507, 573, 638, 718, 754, 779, 866, 897, 947, 995, 1067, 1088, 1125, 1169, 1288, 1339, 1424, 1468, 1484, 1507, 1589, 1607, 1638, 1680, 1732, 1810, 1848, 1891, 1929, 1967, 2197, 2237, 2269, 2388, 2426, 2577, 2612, 2652, 2783, 2824, 2861, 2914, 2857, 3013, 3030, 3053 and 3084 $cm^{-1}$ (FIG. 4); X-ray diffraction pattern: peaks at Bragg angles of 7.3, 9.1, 10.9, 13.4, 18.6, 20.3, 27.0, 28.8 and 33.1, with highest peak at 27.0 degrees 2Θ (2 theta ±0.2°) (FIG. 5).

EXAMPLE III

Figure 6:
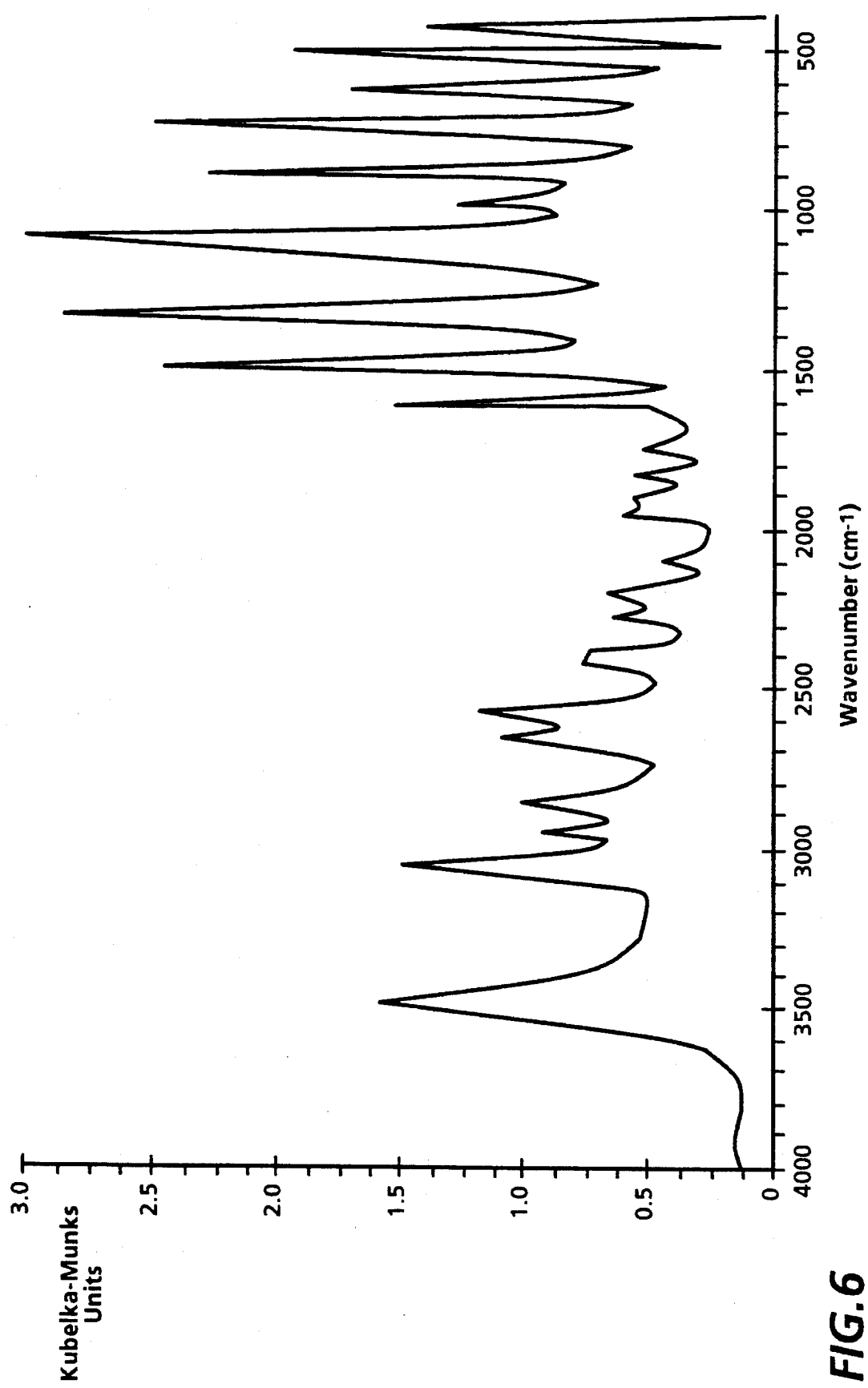
FIG. 6 is an infrared plot of the Type I hydroxygallium phthalocyanine prepared as described in Example III.
Figure 7:
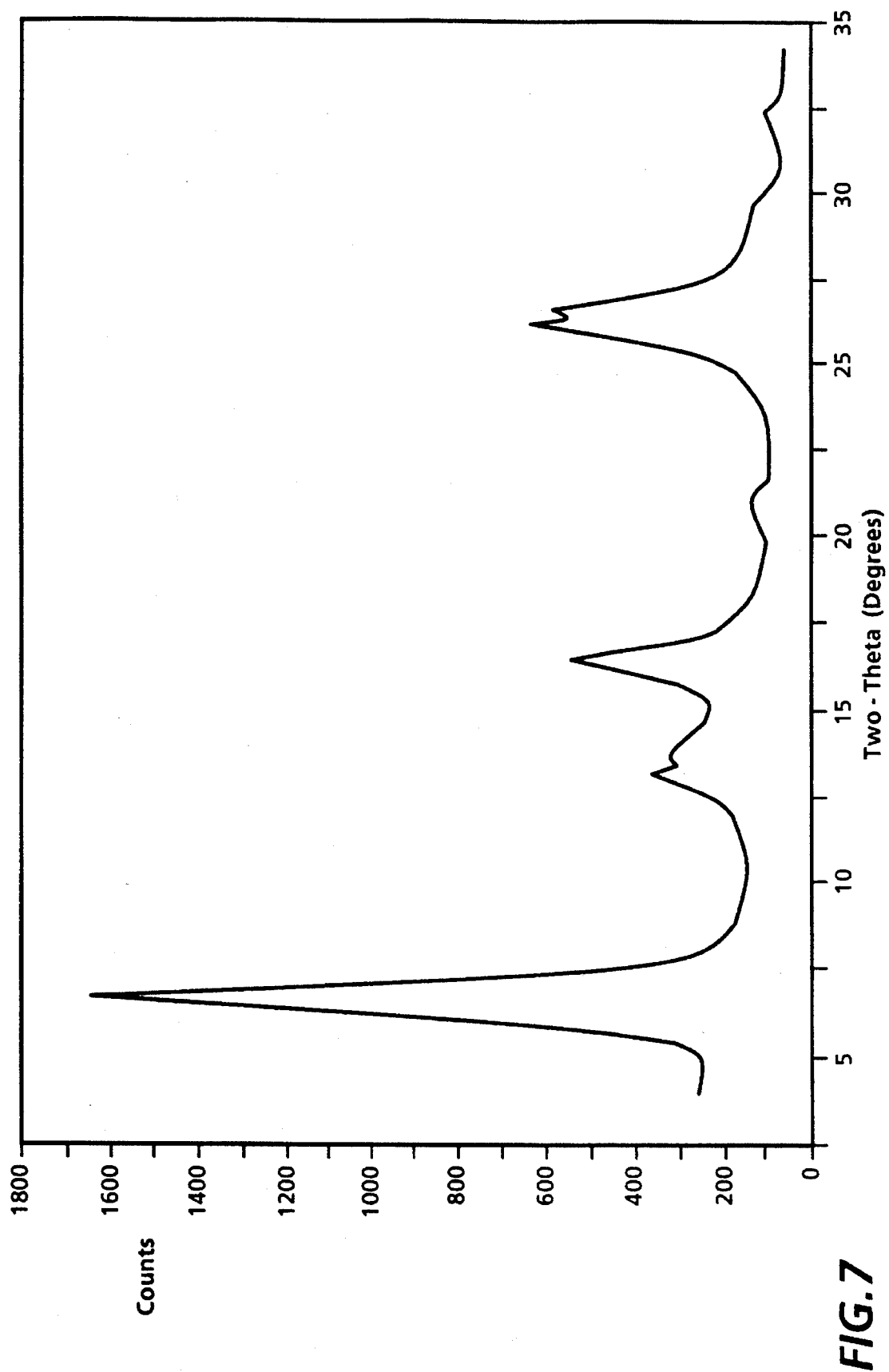
FIG. 7 is an X-ray powder diffraction trace for the Type I hydroxygallium phthalocyanine prepared as described in Example III.

Hydrolysis of Chlorogallium Phthalocyanine to Hydroxygallium Phthalocyanine:

The hydrolysis of chlorogallium phthalocyanine synthesized in Example IT above to hydroxygallium phthalocyanine was performed as follows. Sulfuric acid (94 to 96 percent, 125 grams) was heated to 40° C. in a 125 milliliter Erlenmeyer flask and then 5 grams of the chlorogallium phthalocyanine were added. Addition of the solid was completed in approximately 15 minutes, during which time the temperature of the solution increased to about 48° C. The acid solution was then stirred for 2 hours at 40° C., after which it was added in a dropwise fashion to a mixture comprised of concentrated (about 30 percent) ammonium hydroxide (265 milliliters) and deionized water (435 milliliters), which had been cooled to a temperature below 5° C. The addition of the dissolved phthalocyanine was completed in approximately 30 minutes, during which time the temperature of the solution increased to about 40° C. The reprecipitated phthalocyanine was then removed from the cooling bath and allowed to stir at room temperature for 1 hour. The resulting phthalocyanine was then filtered through a porcelain funnel fitted with a Whatman 934-AH grade glass fiber filter. The resulting blue solid was redispersed in fresh deionized water by stirring at room temperature for 1 hour and filtered. This process was repeated at least three times, until the conductivity of the filtrate was <20 μS. The filtercake was oven dried overnight at 50° C. to provide 4.75 grams (95 percent) of Type I HOGaPc, identified by infrared spectroscopy and X-ray powder diffraction. Infrared spectroscopy: major peaks at 507, 573, 629, 729, 756, 772, 874, 898, 956, 984, 1092, 1121, 1165, 1188, 1290, 1339, 1424, 1468, 1503, 1588, 1611, 1757, 1835, 1951, 2099, 2207, 2280, 2384, 2425, 2570, 2608, 2652, 2780, 2819, 2853, 2907, 2951, 3049 and 3479 (broad) $cm^{-1}$ (FIG. 6); X-ray diffraction pattern: peaks at Bragg angles of 6.8, 13.0, 16.5, 21.0, 26.3 and 29.5, with the highest peak at 6.8 degrees 2Θ (2 theta ±0.2°) (FIG. 7).

EXAMPLE IV

Figure 8:
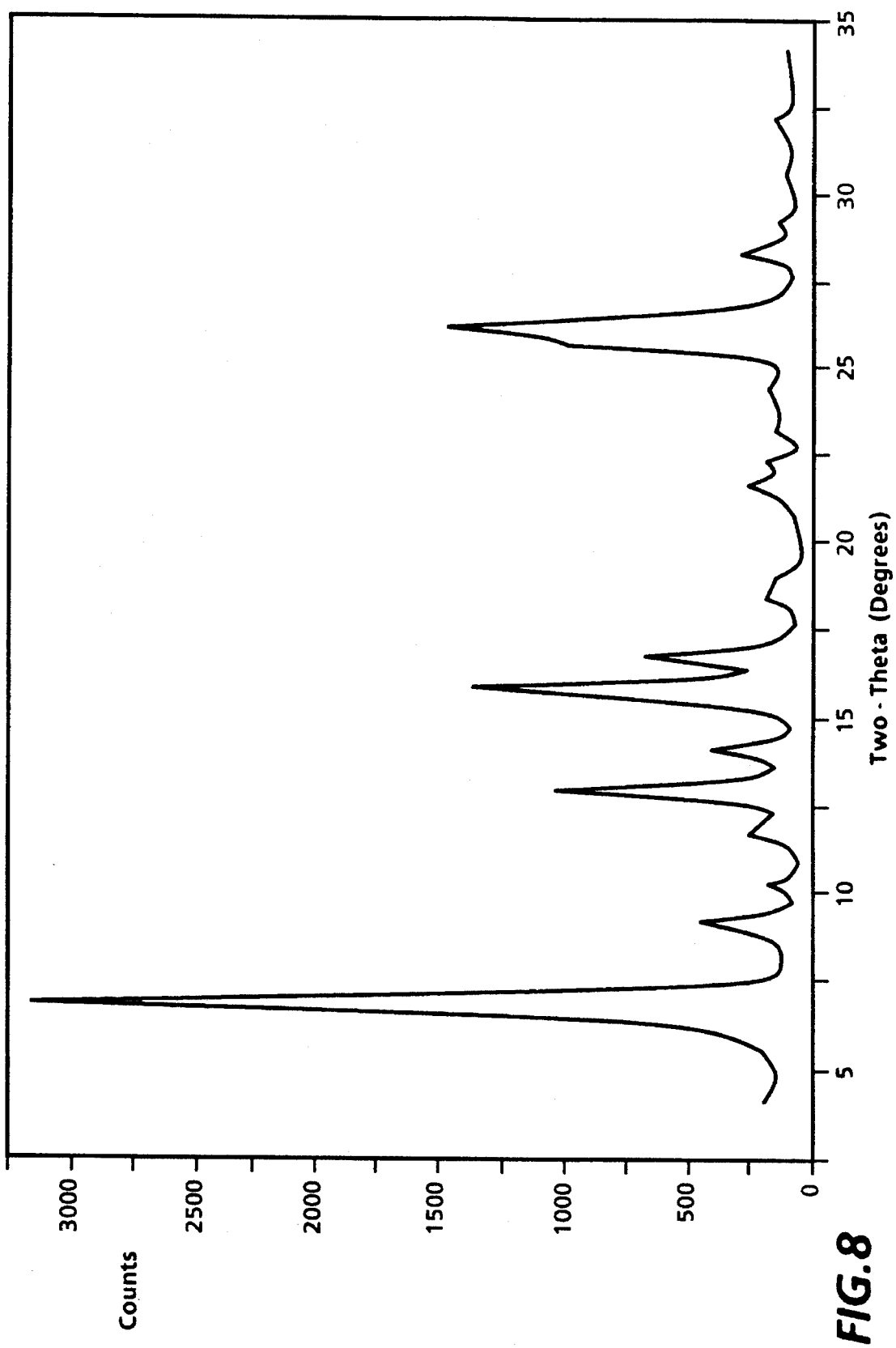
FIG. 8 is an X-ray powder diffraction trace for the alkoxybridged gallium phthalocyanine dimer (Type I polymorph with a low level of crystallinity) prepared as described in Example IV.

Synthesis of Alkoxy-bridged Gallium Phthalocyanine Dimer From Hydroxygallium Phthalocyanine at 120° C.:

To a 500 milliliter round bottomed flask were added 6.0 grams of hydroxygallium phthalocyanine and 200 milliliters of ethylene glycol. The mixture was stirred while heating at 120° C. for 5 hours. The alkoxy-bridged gallium phthalocyanine dimer was isolated by filtration and then twice washed with 200 milliliters of methanol. The product was dried at 60° C. under vacuum for 18 hours. The alkoxy-bridged gallium phthalocyanine dimer, 1,2-di(oxogallium phthalocyaninyl) ethane, was isolated as a dark blue solid in 90 percent yield. The dimer product was characterized by infrared spectroscopy, $^1H$ NMR spectroscopy and X-ray powder diffraction. Infrared spectroscopy: major peaks at 573, 611, 636, 731, 756, 775, 874, 897, 962, 999, 1069, 1088, 1125, 1165, 1289, 1337, 1424, 1466, 1503, 1611, 2569, 2607, 2648, 2864, 2950, and 3045 $cm^{-1}$ (identical to FIG. 1); $^1H$ NMR spectroscopy (TFA-d/CDCl$_3$ solution, 1:1 v/v, tetramethylsilane reference): peaks at (δ, ppm ±0.01 ppm) 4.00 (4H), 8.54 (16H), and 9.62 (16H) (identical to FIG. 2); X-ray powder diffraction pattern: peaks at Bragg angles (2Θ±0.2°) of 6.7, 8.9, 12.8, 13.9, 15.7, 16.6, 5.9, and 28.3, with the highest peak at 6.7 degrees 2Θ (FIG. 8).

EXAMPLE V

Alkoxy-bridged Gallium Phthalocyanine Dimer Synthesis From Hydroxygallium Phthalocyanine at 190° C.:

To a 500 milliliter round bottomed flask were added 6.0 grams of hydroxygallium phthalocyanine and 200 milliliters of ethylene glycol. The mixture was stirred while heating at 190° C. for 5 hours. The alkoxy-bridged gallium phthalocyanine dimer was isolated by filtration and then twice washed with 200 milliliters of methanol. The product was dried at 0° C. under vacuum for 18 hours. The alkoxy-bridged gallium phthalocyanine dimer, 1,2-di(oxogallium phthalocyaninyl) ethane, was isolated as a dark blue solid in 90 percent yield. The dimer product was characterized by infrared spectroscopy, $^1H$ NMR spectroscopy and X-ray powder diffraction. Infrared spectroscopy: major peaks at 573, 611,636, 731,756, 775, 874, 897, 962,999, 1069, 1088, 1125, 1165, 1289, 1337, 1424, 1466, 1503, 1611, 2569, 2607, 2648, 2864, 2950, and 3045 $cm^{-1}$ (identical to FIG. 1); $^1H$ NMR spectroscopy (TFA-d/CDCl3 solution, 1:1 v/v, tetramethylsilane reference): peaks at (δ, ppm + 0.01 ppm) 4.00 (4H), 8.54 (16H), and 9.62 (16H) (identical to FIG. 2); X-ray powder diffraction pattern: peaks at Bragg angles(2Θ±0.2°) of 6.7, 8.9, 12.8, 13.9, 15.7, 16.6, 21.2, 25.3, 25.9, and 28.3, with the highest peak at 6.7 degrees 2Θ (E) (identical to FIG. 3).

COMPARATIVE EXAMPLE 1

Figure 9:
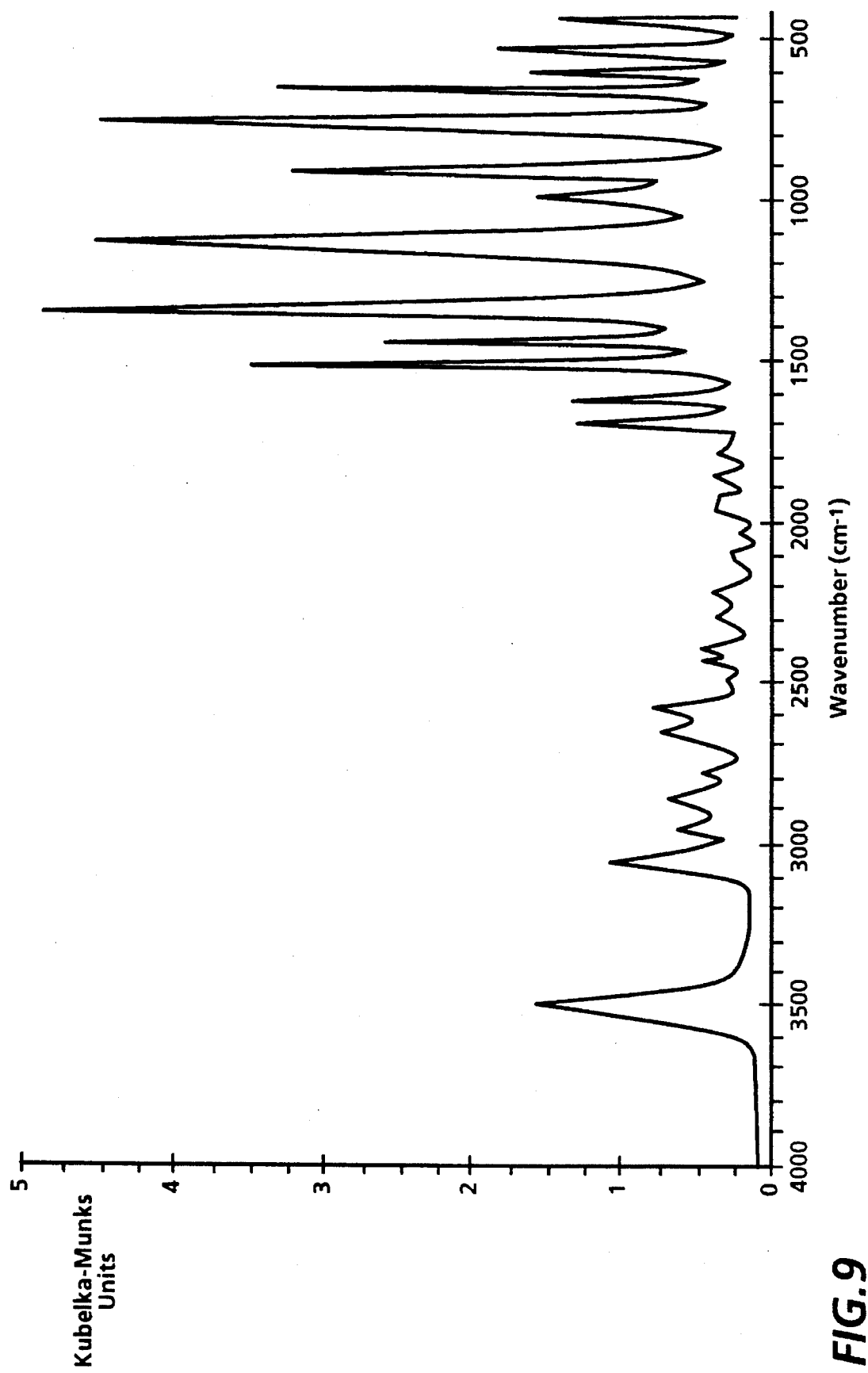
FIG. 9 is an infrared plot of the Type V hydroxygallium phthalocyanine prepared as described in Comparative Example 1.
Figure 10:
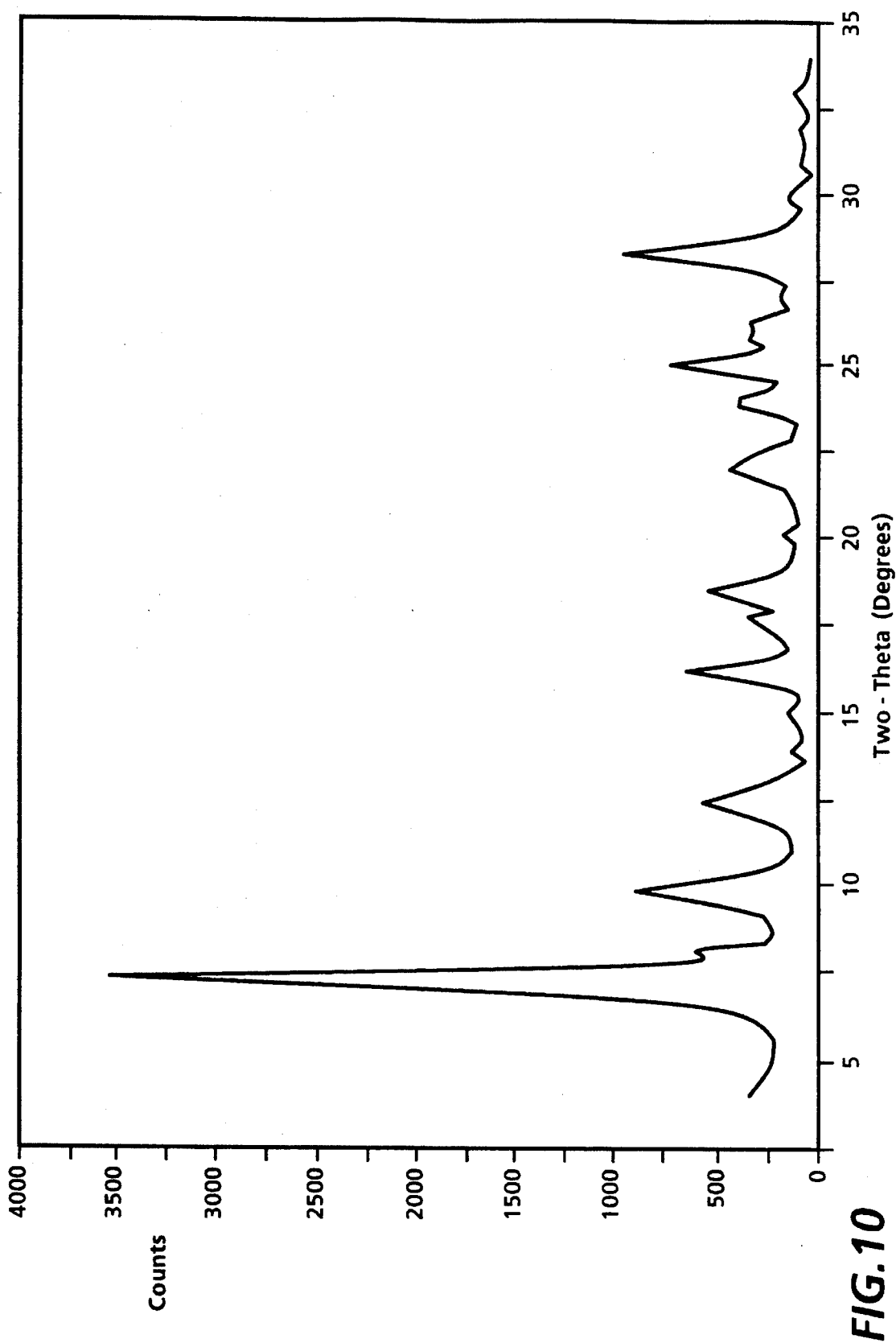
FIG. 10 is an X-ray powder diffraction trace for the Type V hydroxygallium phthalocyanine prepared as described in Comparative Example 1.

Conversion of Type I Hydroxygallium Phthalocyanine to Type V:

The Type I hydroxygallium phthalocyanine pigment obtained in Example III above was converted to Type V HOGaPc as follows. The Type I hydroxygallium phthalocyanine pigment (3.0 grams) was added to 25 milliliters of N,N-dimethylformamide in a 60 milliliter glass bottle containing 60 grams of glass beads (0.25 inch in diameter). The bottle was sealed and placed on a ball mill overnight (18 hours). The solid was isolated by filtration through a porcelain funnel fitted with a Whatman GF/F grade glass fiber filter, and washed in the filter using several 25 milliliter portions of acetone. The filtercake was oven dried overnight at 50° C. to provide 2.8 grams of Type V HOGaPc which was identified by infrared spectroscopy and X-ray powder diffraction. Infrared spectroscopy: major peaks at 507, 571, 631,733,756, 773,897, 965, 1067, 1084, 1121, 1146, 1165, 1291, 1337, 1425, 1468, 1503, 1588, 1609, 1757, 1848, 1925, 2099, 2205, 2276, 2384, 2425, 2572, 2613, 2653, 2780, 2861, 2909, 2956, 3057 and 3499 (broad) cm$^{-1}$ FIG. 9); X-ray diffraction pattern: peaks at Bragg angles of 7.4, 9.8. 12.4 12.9, 16.2, 18.4, 21.9, 23.9, 25.0 and 28.1, with the highest peak at 7.4 degrees 2$\Theta$(2 theta $\pm$0.2° ) (FIG. 10).

EXAMPLE VI

The alkoxy-bridged gallium phthalocyanine dimers prepared in Examples IV and V, and the Type V HOGaPc prepared in Comparative Example 1 were utilized as a photogenerating layer or a photogenerating pigment in a layered photoconductive imaging member prepared by the following procedure. An aluminized MYLAR® substrate, about 4 mil in thickness, was first coated with a blocking layer of a silane/zirconium alkoxide solution prepared by mixing 6.5 grams of acetylacetonate tributoxy zirconium (ZC540), 0.75 gram of (a minopropyl)trimethoxysilane (A1110), 28.5 gram of isopropyl alcohol, and 14.25 gram of butanol using a number 5 wire wound rod applicator. The blocking layer was dried at 140° C. for 20 minutes; the final thickness was measured to be 0.1 micron.

A dispersion was prepared by combining 0.5 gram of $C_{32}H_{16}N_8GaOCH_2CH_2OGaN_8H_{16}C_{32}$ prepared as described in Examples IV and V, and 0.26 gram of poly(vinyl butyral) in 25.2 grams of chlorobenzene in a 60 milliliter glass jar containing 70 grams of 0.8 millimeter glass beads. The dispersion was shaken on a paint shaker for 2 hours and then coated onto the above silane/zirconium layer using a number 6 wire wound rod applicator. The alkoxy-bridged gallium phthalocyanine dimer photogenerating layer so formed was dried at 100° C. for 10 minutes to a final thickness of about 0.20 micron.

A hole transporting layer solution was prepared by dissolving 5.4 grams of N,N'-diphenyl-N,N-bis(3-methyl phenyl)-1,1'-biphenyl-4,4'-diamine, and 8.1 grams of polycarbonate in 61.5 grams of chlorobenzene. The solution was coated onto the alkoxy-bridged gallium phthalocyanine dimer photogenerator layer using a 10 mil film applicator. The charge transporting layer thus obtained was dried at 115° C. for 60 minutes to provide a final thickness of about 28 microns.

A dispersion was prepared by combining 0.5 gram of Type V HOGaPc prepared as described in Comparative Example 1 , and 0.26 gram of poly(vinyl butyral) in 25.2 grams of chlorobenzene in a 60 milliliter glass jar containing 70 grams of 0.8 millimeter glass beads. The dispersion was shaken on a paint shaker for 2 hours and then coated onto the above silane/zirconium layer using a number 6 wire wound rod applicator. The alkoxy-bridged gallium phthalocyanine dimer photogenerating layer formed was dried at 100° C. for 10 minutes to a final thickness of about 0.20 micron.

A hole transporting layer solution was prepared by dissolving 5.4 grams of N,N'-diphenyl-N,N-bis(3-methyl phenyl)-1,1'-biphenyl-4,4'- diamine, and 8.1 grams of polycarbonate in 61.5 grams of chlorobenzene. The solution was coated onto the alkoxy-bridged gallium phthalocyanine dimer photogenerator layer using a 10 mil film applicator. The charge transporting layer thus obtained was dried at 115° C. for 60 minutes to provide a final thickness of about 28 microns.

The xerographic electrical properties of photoresponsive imaging members prepared as described above were determined by electrostatically charging the surface thereof with a corona discharge source until the surface potential, as measured by a capacitatively coupled probe attached to an electrometer, attained an initial dark value, $V_0$, of −800 volts. After resting for 0.5 second in the dark, the charged member reached a surface potential, $Vdd_p$, or dark development potential. The member was then exposed to filtered light from a Xenon lamp. A reduction in surface potential from Vddp to a background potential, $V_{bg}$, due to the photodischarge effect was observed. The dark decay in volts per second was calculated as $(V0V_{ddp})/0.5$. The half exposure energy, that is $E_{1/2}$ is the amount of exposure energy causing reduction of the $V_{ddp}$ to half of its initial value, was determined. $E_{800-100V}$, which is the amount of exposure energy causing reduction of the $V_{ddp}$ from −800 volts to −100 volts, was also determined. The wavelength of light selected was 780 nanometers.

In a cycling test, the above prepared devices or photoconductive imaging members were charged with a corotron to about −800 volts. They were exposed with 775 nanometers of light with an intensity of about 7 ergs/cm$^2$ and erased with white light of about 60 ergs/cm$^2$. The dark development ($V_{ddp}$) and background ($V_{bg}$) potentials were measured and recorded while the testing was performed for 10,000 cycles. After the cycling test had been completed, the devices remained in the dark for about 20 hours. After charging the device to about −800 volts with a corotron, they were exposed with 775 nanometers of light with an intensity of 3 ergs/cm$^2$ and erased with white light of about 200 ergs/cm$^2$. The dark development and background potentials were measured and recorded while the testing was performed for 5,000 cycles. The significantly higher erase light intensity used in this second test compared to the standard test accelerates the cycledown (decrease in the dark development potential) in the photogenerator material, and is thus considered a stress test.

The imaging member prepared with the alkoxy-bridged gallium phthalocyanine dimer prepared in Example IV had a dark decay of 36.2 volts per second, $E_{1/2}$ =1.66 ergs/cm$^2$, and an $E_{800-100V}$=3.87 ergs/cm$^2$. In cycling tests, the device had a cycle down of −24 volts after 10,000 cycles and a cycle down of −32 volts after 5,000 cycles in the more stressful test.

The imaging member prepared with the alkoxy-bridged gallium phthalocyanine dimer prepared in Example V had a dark decay of 25.6 volts per second, E½=1.69 ergs/cm$^2$, and an $E_{800-100V}$=4.01 ergs/cm$^2$. In cycling tests, the device had a cycledown of −28 volts after 10,000 cycles and a cycledown of −37 volts after 5,000 cycles in the more stressful test.

The imaging member prepared with the Type V HOGaPc prepared in Comparative Example 1 had a dark decay of 22.2 volts per second, $E_{1/2}$=1.54 ergs/cm$^2$, and an $E_{800-100V}$= 3.84 ergs/cm$^2$. In cycling tests, the device had a cycledown of −47 volts after 10,000 cycles and a cycledown of −90 volts after 5,000 cycles in the more stressful test.

From the information summarized in the Table, it is evident that the alkoxy-bridged gallium phthalocyanine dimer of this invention enabled imaging members, and improved cyclic stability (smaller voltage loss) when compared to Type V hydroxygallium phthalocyanine obtained from a chlorogallium phthalocyanine precursor.

TABLE

Comparative Electrical Properties of Phthalocyanine Photogenerators

| Device # | P/G Material | P/G Example Example No | Dark Decay Volts/Sec. | $E_{1/2}$ erg/cm$^2$ | $E_{800-100v}$ erg/cm$^2$ | Cycle-Down 10k Volts | Cycle-Down 5k Stress Test Volts |
|---|---|---|---|---|---|---|---|
| 1 | Dimer | IV | 36.2 | 1.66 | 3.87 | −24 | −32 |
| 2 | Dimer | V | 25.6 | 1.69 | 4.01 | −28 | −37 |
| 3 | HOGaPc from ClGaPc | Comparative Example 1 | 22.2 | 1.54 | 3.84 | −47 | −90 |

Other embodiments and modifications of the present invention may occur to those skilled in the art subsequent to a review of the information presented herein; these embodiments and modifications, as well as equivalents thereof, are also included within the scope of this invention.

What is claimed is:

1. A photoconductive imaging member comprised of a supporting substrate and a photogenerator layer comprised of an alkoxy-bridged metallophthalocyanine dimer as a charge generator material, wherein said dimer is of the molecular formula $C_{32}H_{16}N_8MOROMN_8H_{16}C_{32}$ and the following structural formula wherein M is a trivalent metal, and R is an alkyl group or an alkyl ether group.

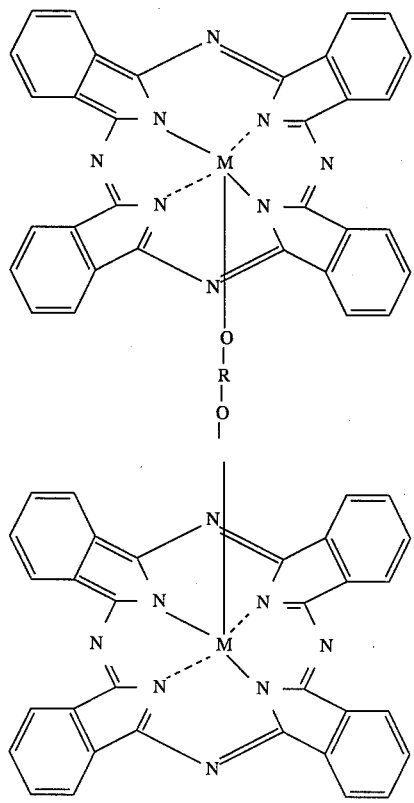

2. An imaging member in accordance with claim 1 wherein the trivalent metal in the alkoxy-bridged metallophthalocyanine dimer is aluminum, gallium, indium, or a trivalent metal of Mn(III), Fe(III), Co(III), Ni(III), Cr(III), or V(III).

3. An imaging member in accordance with claim 1 wherein R in the alkoxy-bridged metallophthalocyanine dimer is selected from the group consisting of:

—$(CH_2)_n$— wherein n is a number of from 2 to 12;

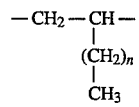

wherein n is a number of from 0 to 4;

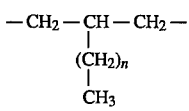

wherein n is a number of from 0 to 4;

—$[(CH_2)_m$—O—$(CH_2)_m]_n$— wherein n is a number of from 1 to 4, and m is a number of from 2 to 4; and —$[CH(CH_3)CH_2$—O—$CH_2(CH_3)CH]_n$— wherein n is a number of from 1 to 3.

4. An imaging member in accordance with claim 1 wherein the alkoxy-bridged metallophthalocyanine dimer is an alkoxy-bridged gallium phthalocyanine dimer of the formula $C_{32}H_{16}N_8GaOROGaN_8H_{16}C_{32}$.

5. An imaging member in accordance with claim 1 wherein said dimer is 1,2-di(oxogallium phthalocyaninyl)ethane of the formula $C_{32}H_{16}N_8GaOCH_2CH_2OGaN_8H_{16}C_{32}$; 1,3-di(oxogallium phthalocyaninyl)propane of the formula $C_{32}H_{16}N_8GaOCH_2CH_2CH_2OGaN_8H_{16}C_{32}$; or 1,2-di(oxogallium phthalocyaninyl)propane of the formula $C_{32}H_{16}N_8GaOCH(CH_3)CH_2OGaN_8H_{16}C_{32}$.

6. An imaging member in accordance with claim 1 wherein said dimers are selected from the group consisting of 1,2-di(oxoaluminum phthalocyaninyl)ethane, 1,2-di(oxoaluminum phthalocyaninyl)ethane, 1,2-di(oxoindium phthalocyaninyl)ethane, 1,3-di(oxoaluminum phthalocyaninyl)propane, 1,3-di(oxigallium phthalocyaninyl)propane, 1,3-di(oxoindium phthalocyaninyl)propane, 1,2-di(oxoaluminum phthalocyaninyl)propane, 1,2-di(oxogallium phthalocyaninyl)propane and 1,2-di(oxoindium phthalocyaninyl)propane.

7. A photoconductive imaging member comprised of a supporting substrate, a photogenerator layer comprised of an alkoxy-bridged metallophthalocyanine dimer of the molecular formula $C_{32}H_{16}N_8MOROMN_8H_{16}C_{32}$ and the following structural formula

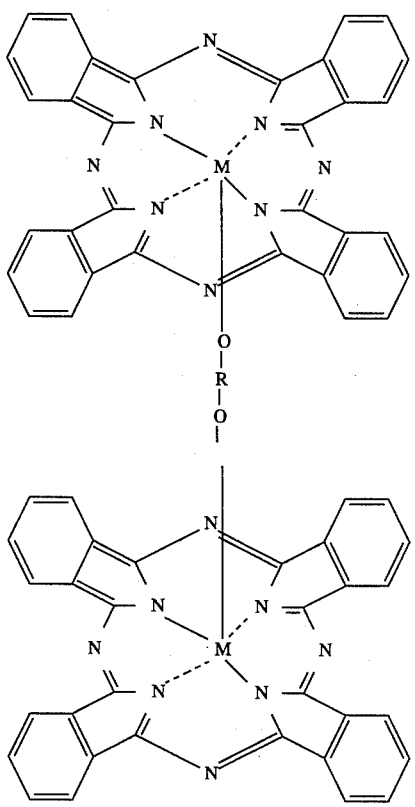

wherein M is a trivalent metal, and R is an alkyl group or an alkyl ether group, and a charge transport layer.

8. An imaging member in accordance with claim 7 wherein the supporting substrate is comprised of a metal, a conductive polymer composition, or an insulating polymer with a thickness of from about 30 microns to 300 microns optionally overcoated with an electrically conductive layer with a thickness of from about 0.01 micron to 1 micron.

9. An imaging member in accordance with claim 7 wherein the supporting substrate is comprised of aluminum and there is further included an overcoating top layer on said member comprised of a polymer.

10. An imaging member in accordance with claim 9 wherein the overcoating top layer polymer is a polyamide or nylon.

11. An imaging member in accordance with claim 7 wherein the alkoxy-bridged metallophthalocyanine dimer photogenerator pigment is dispersed in a resinous binder in an amount of from about 5 percent to about 95 percent by weight.

12. An imaging member in accordance with claim 11 wherein the resinous binder is a polyester, a polyvinylcarbazole, a polyvinylbutyral, a polycarbonate, a polyethercarbonate, an aryl amine polymer, a styrene copolymer, or a phenoxy resin.

13. An imaging member in accordance with claim 7 wherein the charge transport layer is comprised of aryl amines or aryl amine polymers.

14. An imaging member in accordance with claim 7 wherein the charge transport layer is comprised of aryl amines of the formula

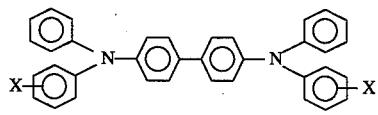

dispersed in a highly insulating polymer in an amount of from about 20 to 60 percent wherein X is an alkyl group or a halogen.

15. An imaging member in accordance with claim 14 wherein the highly insulating polymer iS a polycarbonate, a polyester, or a vinyl polymer.

16. An imaging member in accordance with claim 7 wherein the photogenerating layer is of a thickness of from about 1 to about 10 microns.

17. An imaging member in accordance with claim 7 wherein the charge transport layer is of a thickness of from about 10 to about 100 microns.

18. An imaging member in accordance with claim 7 wherein the supporting substrate is overcoated with a polymeric adhesive layer of a a polyester of a thickness of from about 0.01 to about 1 micron.

19. A photoconductive imaging member in accordance with claim 7 wherein the charge transport layer is situated between the supporting substrate and the photogenerator layer.

20. A photoconductive imaging member in accordance with claim 7 wherein the dimer is 1,2-di(oxogallium phthalocyaninyl)ethane of the formula $C_{32}H_{16}N_8GaOCH_2CH_2OGaN_8H_{16}C_{32}$; or 1,3-di(oxogallium phthalocyaninyl)propane of the formula $C_{32}H_{16}N_8GaOCH_2CH_2CH_2OGaN_8H_{16}C_{32}$; or 1,2-di(oxogallium phthalocyaninyl)propane of the formula $C_{32}H_{16}N_8GaOCH(CH_3)CH_2OGaN_8H_{16}C_{32}$.

21. An imaging member in accordance with claim 7 wherein said dimers are selected from the group consisting of 1,2-di(oxoaluminum phthalocyaninyl)ethane, 1,2-di(oxogallium phthalocyaninyl)ethane, 1,2-di(oxoindium phthalocyaninyl)ethane, 1,3-di(oxoaluminum phthalocyaninyl)propane, 1,3-di(oxogallium phthalocyaninyl)propane, 1,3-di(oxoindium phthalocyaninyl)propane, 1,2-di(oxoaluminum phthalocyaninyl)propane, 1,2-di(oxogallium phthalocyaninyl)propane, and 1,2-di(oxoindium phthalocyaninyl)propane.

22. An imaging method which comprises the formation of a latent image on a photoconductive imaging member comprised of a supporting substrate and a photogenerator layer comprised of an alkoxy-bridged metallophthalocyanine dimer as a charge generator material, wherein said dimer is of the molecular formula $C_{32}H_{16}N_8MOROMN_8H_{16}C_{32}$ and the following structral formula wherein M is a trivalent metal, and R is an alkyl group or an alkyl ether group

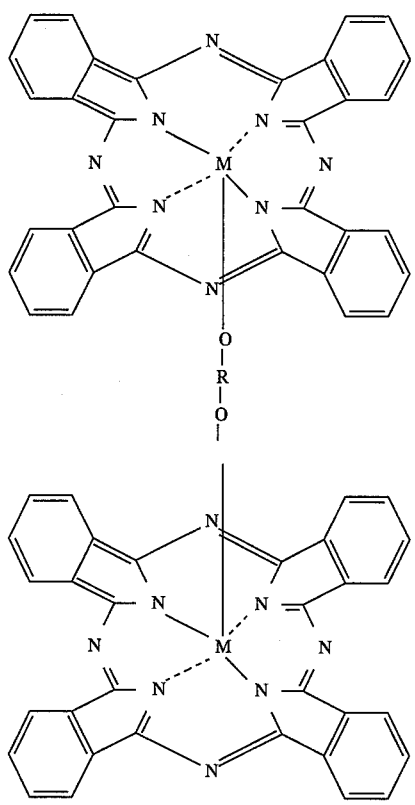

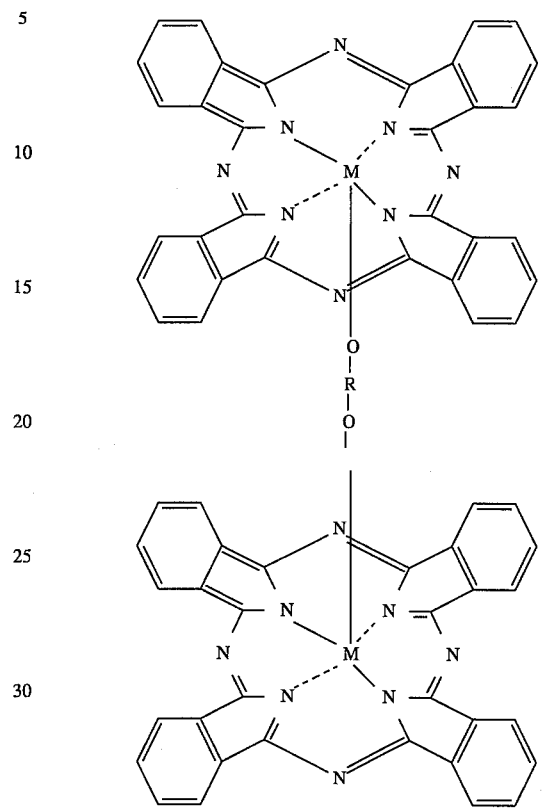

developing the image with a toner composition comprised of resin and pigment, transferring the developed image to a substrate and fixing the developed image thereto.

23. Am imaging method which comprises the formation of a latent image on a photoconductive imaging member comprised of a supporting substrate, a photogenerator layer comprised of an alkoxy-bridged metallophthalocyanine dimer of the molecular formula $C_{32}H_{16}N_8MOROMN_8H_{16}C_{32}$ and the following structural formula wherein M is a trivalent metal, and R is an alkyl group or an alkyl ether group, and a charge transport layer, developing the image with a toner composition comprised of resin and pigment, tranferring the developed image to a substrate and fixing the developed image thereto.

* * * * *